US012777475B2

(12) United States Patent
Soltani et al.

(10) Patent No.: US 12,777,475 B2
(45) Date of Patent: Oct. 27, 2026

(54) PROBABILISTIC CONSTELLATION SHAPING FOR PEAK-TO-AVERAGE POWER RATIO REDUCTION IN NARROW BAND

(71) Applicant: QUALCOMM Incorporated, San Diego, CA (US)

(72) Inventors: Morteza Soltani, San Diego, CA (US); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 18/335,947

(22) Filed: Jun. 15, 2023

(65) Prior Publication Data

US 2024/0422771 A1 Dec. 19, 2024

(51) Int. Cl.
*H04W 72/1263* (2023.01)
*H04L 27/26* (2006.01)

(52) U.S. Cl.
CPC ..... *H04W 72/1263* (2013.01); *H04L 27/2614* (2013.01)

(58) Field of Classification Search
CPC ............. H04L 27/2614; H04L 5/0044; H04W 72/1263
See application file for complete search history.

(56) References Cited

U.S. PATENT DOCUMENTS 11,184,107 B2 * 11/2021 Aboul-Magd ...... H04L 27/3483
2013/0336649 A1 * 12/2013 Essiambre ............ H04L 1/0003 398/25
2021/0195568 A1 * 6/2021 Wang .................... H04L 5/0016
2023/0403071 A1 * 12/2023 Chen .................. H04B 7/18526
2024/0014986 A1 * 1/2024 Stauffer .................. H04L 27/30
2024/0039777 A1 * 2/2024 Meng .................... H04L 1/0067
2025/0055643 A1 * 2/2025 Wang ................... H04B 7/0413
2025/0184204 A1 * 6/2025 Jin ...................... H04L 27/3405

OTHER PUBLICATIONS

Kakkavas A., et al., "On the PAPR Characteristics of DFT-s-OFDM with Geometric and Probabilistic Constellation Shaping", 2017 IEEE 18th International Workshop on Signal Processing Advances in Wireless Communications (SPAWC), Jul. 3-6, 2017, 5 Pages.

* cited by examiner

*Primary Examiner* — Romani Ohri
(74) *Attorney, Agent, or Firm* — Holland & Hart LLP

(57) ABSTRACT

Methods, systems, and devices for wireless communications are described. A wireless communication device may transmit an indication of a probabilistically-shaped (PS) constellation being enabled for transmission of one or more messages. The wireless communication device may communicate a grant with a second wireless communication device, the grant indicating a set of resources including one or more resource blocks for transmission of a message of the one or more messages. The wireless communication device may transmit the message over the set of resources in accordance with the PS constellation based on a quantity of the one or more resource blocks of the set of resources failing to satisfy a threshold quantity of resource blocks. In some examples, the wireless communication device may transmit a second indication of the PS constellation, where transmitting the message in accordance with the PS constellation may be based on transmitting the second indication.

30 Claims, 14 Drawing Sheets

PROBABILISTIC CONSTELLATION SHAPING FOR PEAK-TO-AVERAGE POWER RATIO REDUCTION IN NARROW BAND

FIELD OF TECHNOLOGY

The following relates to wireless communications, including probabilistic constellation shaping for peak-to-average power ratio (PAPR) reduction in narrow band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses (e.g., wireless communication devices) that support probabilistic constellation shaping for peak-to-average power ratio (PAPR) reduction in narrow band. For example, the described techniques provide for modifying an objective function for a probabilistically-shaped (PS) constellation to reduce PAPR. In some cases, the described techniques may allow for an increase to an operating point for a power amplifier to increase an output power, and thereby increase a reliability as well as a throughput of transmissions. In some examples, a wireless communication device (e.g., a user equipment (UE) or a network entity) may transmit an indication of a PS constellation being enabled for transmissions. For example, for downlink transmissions, a network entity may indicate to a UE a PS constellation (e.g., via an enable flag or an index of the PS constellation) for PAPR reduction that will be used for a later transmission from the network entity to the UE. For uplink transmissions, the UE may transmit a similar indication to the network entity. The wireless communication device may also communicate a grant and may transmit a message in accordance with the PS constellation. For example, the network entity may transmit a grant to the UE, and may transmit a message (or receive a message from the UE) in accordance with the PS constellation using resources indicated in the grant. In some examples, the PS constellation for PAPR minimization may be selected based on a resource allocation.

A method for wireless communications by a wireless communication device is described. The method may include transmitting an indication of a probabilistically-shaped constellation being enabled for transmission of one or more messages, communicating a grant indicating a set of resources including one or more resource blocks for transmission of a message of the one or more messages, and transmitting the message over the set of resources in accordance with the probabilistically-shaped constellation based on a quantity of the one or more resource blocks of the set of resources failing to satisfy a threshold quantity of resource blocks.

A wireless communication device for wireless communication is described. The wireless communication device may include one or more processors and one or more memories coupled with the one or more processors, the one or more memories including instructions. The instructions may be executable by the one or more processors to individually or collectively cause the wireless communication device to transmit an indication of a probabilistically-shaped constellation being enabled for transmission of one or more messages, communicate a grant indicating a set of resources including one or more resource blocks for transmission of a message of the one or more messages, and transmit the message over the set of resources in accordance with the probabilistically-shaped constellation based on a quantity of the one or more resource blocks of the set of resources failing to satisfy a threshold quantity of resource blocks.

Another wireless communication device for wireless communication is described. The wireless communication device may include means for transmitting an indication of a probabilistically-shaped constellation being enabled for transmission of one or more messages, means for communicating a grant indicating a set of resources including one or more resource blocks for transmission of a message of the one or more messages, and means for transmitting the message over the set of resources in accordance with the probabilistically-shaped constellation based on a quantity of the one or more resource blocks of the set of resources failing to satisfy a threshold quantity of resource blocks.

A non-transitory computer-readable medium storing code for wireless communications by a wireless communication device is described. The code may include instructions executable by one or more processors to transmit an indication of a probabilistically-shaped constellation being enabled for transmission of one or more messages, communicate a grant indicating a set of resources including one or more resource blocks for transmission of a message of the one or more messages, and transmit the message over the set of resources in accordance with the probabilistically-shaped constellation based on a quantity of the one or more resource blocks of the set of resources failing to satisfy a threshold quantity of resource blocks.

Some examples of the method, wireless communication devices, and non-transitory computer-readable medium described herein may further include operations, features, means, or instructions for transmitting a second indication of the probabilistically-shaped constellation, where transmitting the message in accordance with the probabilistically-shaped constellation may be based on transmitting the second indication.

In some examples of the method, wireless communication devices, and non-transitory computer-readable medium described herein, the second indication includes an index corresponding to the probabilistically-shaped constellation.

Some examples of the method, wireless communication devices, and non-transitory computer-readable medium described herein may further include operations, features, means, or instructions for receiving a capability message indicating a capability to decode the probabilistically-shaped constellation, where transmitting the message in accordance with the probabilistically-shaped constellation may be based on receiving the capability message.

Some examples of the method, wireless communication devices, and non-transitory computer-readable medium described herein may further include operations, features, means, or instructions for communicating a second grant for a second message indicating a second set of resources including one or more second resource blocks and transmitting the second message over the second set of resources in accordance with a constellation different from the probabilistically-shaped constellation based on a quantity of the one or more second resource blocks of the second set of resources satisfying the threshold quantity of resource blocks.

In some examples of the method, wireless communication devices, and non-transitory computer-readable medium described herein, the wireless communication device includes a user equipment (UE), communicating the grant includes receiving the grant indicating the set of resources, and transmitting the message includes transmitting an uplink message over the set of resources based on receiving the grant.

In some examples of the method, wireless communication devices, and non-transitory computer-readable medium described herein, the wireless communication device includes a network entity, communicating the grant includes transmitting the grant indicating the set of resources, and transmitting the message includes transmitting a downlink message over the set of resources based on transmitting the grant.

In some examples of the method, wireless communication devices, and non-transitory computer-readable medium described herein, the indication includes a flag in a downlink control information message or a medium access control control element message.

In some examples of the method, wireless communication devices, and non-transitory computer-readable medium described herein, the indication includes a flag in a radio resource control message.

In some examples of the method, wireless communication devices, and non-transitory computer-readable medium described herein, the message includes a control information message.

A method for wireless communications by a wireless communication device is described. The method may include receiving an indication of a probabilistically-shaped constellation being enabled for reception of one or more messages, communicating a grant indicating a set of resources including one or more resource blocks for receiving a message of the one or more messages, and receiving the message over the set of resources in accordance with the probabilistically-shaped constellation based on a quantity of the one or more resource blocks of the set of resources failing to satisfy a threshold quantity of resource blocks.

A wireless communication device for wireless communication is described. The wireless communication device may include one or more processors and one or more memories coupled with the one or more processors, the one or more memories including instructions. The instructions may be executable by the one or more processors individually or collectively to cause the wireless communication device to receive an indication of a probabilistically-shaped constellation being enabled for reception of one or more messages, communicate a grant indicating a set of resources including one or more resource blocks for receiving a message of the one or more messages, and receive the message over the set of resources in accordance with the probabilistically-shaped constellation based on a quantity of the one or more resource blocks of the set of resources failing to satisfy a threshold quantity of resource blocks.

Another wireless communication device for wireless communication is described. The wireless communication device may include means for receiving an indication of a probabilistically-shaped constellation being enabled for reception of one or more messages, means for communicating a grant indicating a set of resources including one or more resource blocks for receiving a message of the one or more messages, and means for receiving the message over the set of resources in accordance with the probabilistically-shaped constellation based on a quantity of the one or more resource blocks of the set of resources failing to satisfy a threshold quantity of resource blocks.

A non-transitory computer-readable medium storing code for wireless communications by a wireless communication device is described. The code may include instructions executable by one or more processors to receive an indication of a probabilistically-shaped constellation being enabled for reception of one or more messages, communicate a grant indicating a set of resources including one or more resource blocks for receiving a message of the one or more messages, and receive the message over the set of resources in accordance with the probabilistically-shaped constellation based on a quantity of the one or more resource blocks of the set of resources failing to satisfy a threshold quantity of resource blocks.

Some examples of the method, wireless communication devices, and non-transitory computer-readable medium described herein may further include operations, features, means, or instructions for receiving a second indication of the probabilistically-shaped constellation, where receiving the message in accordance with the probabilistically-shaped constellation may be based on receiving the second indication.

In some examples of the method, wireless communication devices, and non-transitory computer-readable medium described herein, the second indication includes an index corresponding to the probabilistically-shaped constellation.

Some examples of the method, wireless communication devices, and non-transitory computer-readable medium described herein may further include operations, features, means, or instructions for decoding the message in accordance with the probabilistically-shaped constellation based on receiving the indication and the message.

Some examples of the method, wireless communication devices, and non-transitory computer-readable medium described herein may further include operations, features, means, or instructions for transmitting a capability message indicating a capability to decode the probabilistically-shaped constellation, where receiving the message in accordance with the probabilistically-shaped constellation and decoding the message may be based on transmitting the capability message.

Some examples of the method, wireless communication devices, and non-transitory computer-readable medium described herein may further include operations, features, means, or instructions for communicating a second grant for a second message indicating a second set of resources including one or more second resource blocks and receiving the second message over the second set of resources in accordance with a constellation different from the probabilistically-shaped constellation based on a quantity of the one or more second resource blocks of the second set of resources satisfying the threshold quantity of resource blocks.

In some examples of the method, wireless communication devices, and non-transitory computer-readable medium described herein, the wireless communication device includes a UE, communicating the grant includes receiving the grant indicating the set of resources, and receiving the message includes receiving a downlink message over the set of resources based on receiving the grant.

In some examples of the method, wireless communication devices, and non-transitory computer-readable medium described herein, the wireless communication device includes a network entity, communicating the grant includes transmitting the grant indicating the set of resources, and receiving the message includes receiving an uplink message over the set of resources based on transmitting the grant.

In some examples of the method, wireless communication devices, and non-transitory computer-readable medium described herein, the indication includes a flag in a downlink control information message or a medium access control control element message.

In some examples of the method, wireless communication devices, and non-transitory computer-readable medium described herein, the indication includes a flag in a radio resource control message.

In some examples of the method, wireless communication devices, and non-transitory computer-readable medium described herein, the message includes a control information message.

DETAILED DESCRIPTION

Figure 1:
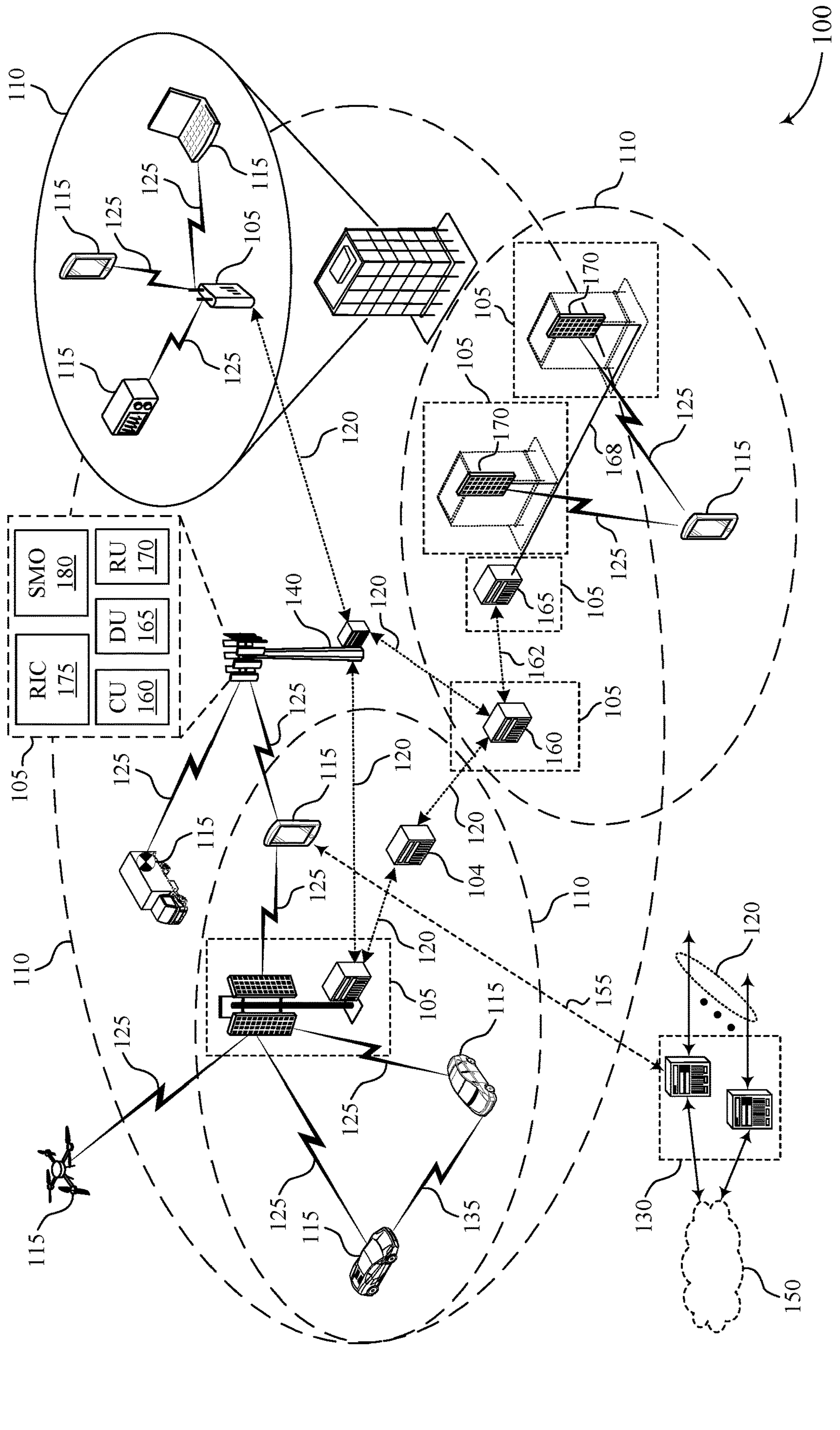
FIG. 1 shows an example of a wireless communications system that supports probabilistic constellation shaping for peak-to-average power ratio (PAPR) reduction in narrow band in accordance with one or more aspects of the present disclosure.

Wireless communication systems may include the use of various modulation schemes for modulating transmissions. For example, quadrature phase-shift keying (QPSK), quadrature amplitude modulation (QAM), among other modulation schemes may be used to modulate an amplitude, phase, or other attribute of a waveform for an uplink or downlink signal to indicate different bits of information. In some examples, a quadrature modulation scheme may be based on two waveforms that are 90 degrees out of phase and are added to generate a waveform, and may be defined by a constellation of points in an IQ plot according to an In-Phase (I) axis and a Quadrature (Q) axis. In some cases, points of a constellation may be weighted differently to achieve an objective function (e.g., a targeted optimized value). For example, points of a QAM constellation may be spaced unequally from each other to weight the points differently, which may be referred to as geometric shaping. Additionally, or alternatively, points of a constellation may be spaced equidistant from each other, but given different probabilities, which may be referred to as probabilistic shaping. By weighting each point differently, an amplitude, phase, or both, of a signal may be shaped accordingly to transmit information.

In some cases, an objective function for probabilistic shaping may be to maximize an achievable throughput given a fixed average power budget, or to alternatively reduce a signal-to-noise ratio (SNR) requirement by reducing a corresponding average power. However, utilizing a constellation (e.g., QAM) designed to maximize throughput or reduce an SNR requirement may not necessarily result in a lower peak-to-average-power ratio (PAPR) compared to a uniform geometric and uniform probability constellation. Reduced PAPR may reduce efficiency of a power amplifier (PA), resulting in limitations in overall power output and a reduction in a reliability of transmissions.

Techniques described herein may enable an objective function for a probabilistically-shaped (PS) constellation to be modified to reduce PAPR such that an operating point for a power amplifier (PA) can be increased to increase an output power, and thereby increase a reliability as well as a throughput of transmissions. For example, in scenarios where PA efficiency (e.g., power consumption) may be targeted (e.g., in coverage-limited scenarios), PS constellations for PAPR reduction may be used for transmission of cyclic prefix orthogonal frequency division multiplexing (OFDM) signals in uplink and downlink. In some cases, for downlink transmissions, a network entity may indicate to a UE a PS constellation for PAPR minimization that will be used for a later transmission from the network entity to the UE. Similarly, for uplink transmissions from the UE to the network entity, the UE may transmit an indication of a PS constellation for PAPR minimization that the UE will use in a transmission. A flag may be included in the indication to signal that such PS constellations for PAPR reduction are enabled. In some examples, a PS constellation for PAPR reduction may be selected based on a resource allocation. For example, the network entity or the UE may select a PS constellation for PAPR reduction for narrow-band transmissions (e.g., using a small quantity of resource blocks (RBs)), which may result in a lower PAPR compared to wider band transmissions. The UE (or the network entity) may also transmit a capability signal to indicate that the UE is able to receive and/or transmit signals according to PS constellations for reduced PAPR.

Aspects of the disclosure are initially described in the context of wireless communications systems. Aspects of the disclosure are further illustrated by and described with reference to modulation procedures, constellations, wireless communication systems, and process flows that relate to probabilistic constellation shaping for PAPR reduction in narrow band. Aspects of the disclosure are further illustrated by and described with reference to wireless communication device diagrams, system diagrams, and flowcharts that relate to probabilistic constellation shaping for PAPR reduction in narrow band.

FIG. 1 shows an example of a wireless communications system 100 that supports probabilistic constellation shaping for PAPR reduction in narrow band in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, a wireless communication device, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, wireless communication device, apparatus, device, computing system, or the like may include disclosure of the UE 115, network entity 105, wireless communication device, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support probabilistic constellation shaping for PAPR reduction in narrow band as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max}-N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support an objective function for a PS constellation to be modified to reduce PAPR such that an operating point of a PA can be increased to increase an output power, and thereby increase a reliability as well as a throughput of transmissions. For example, PS constellations for PAPR minimization may be used for transmission of cyclic prefix OFDM (CP-OFDM) signals in uplink and downlink. In some cases, for downlink transmissions, a network entity 105 may indicate to a UE 115 a PS constellation for PAPR minimization that will be used for a later transmission from the network entity 105 to the UE 115. Similarly, for uplink transmissions from a UE 115 to a network entity 105, the UE 115 may transmit an indication of a PS constellation for PAPR reduction that the UE 115 will use in a transmission. A flag may be included in the indication to signal that such PS constellations for PAPR reduction are enabled. In some examples, a PS constellation for PAPR reduction may be selected based on a resource allocation. For example, a network entity 105 or a UE 115 may select a PS constellation for PAPR reduction for narrow-band transmissions (e.g., using a small quantity of RBs), which may result in a lower PAPR compared to wider band transmissions. A UE 115 (or a network entity 105) may also transmit a capability signal to indicate an ability to receive and/or transmit signals according to PS constellations for minimal PAPR.

Figure 2:
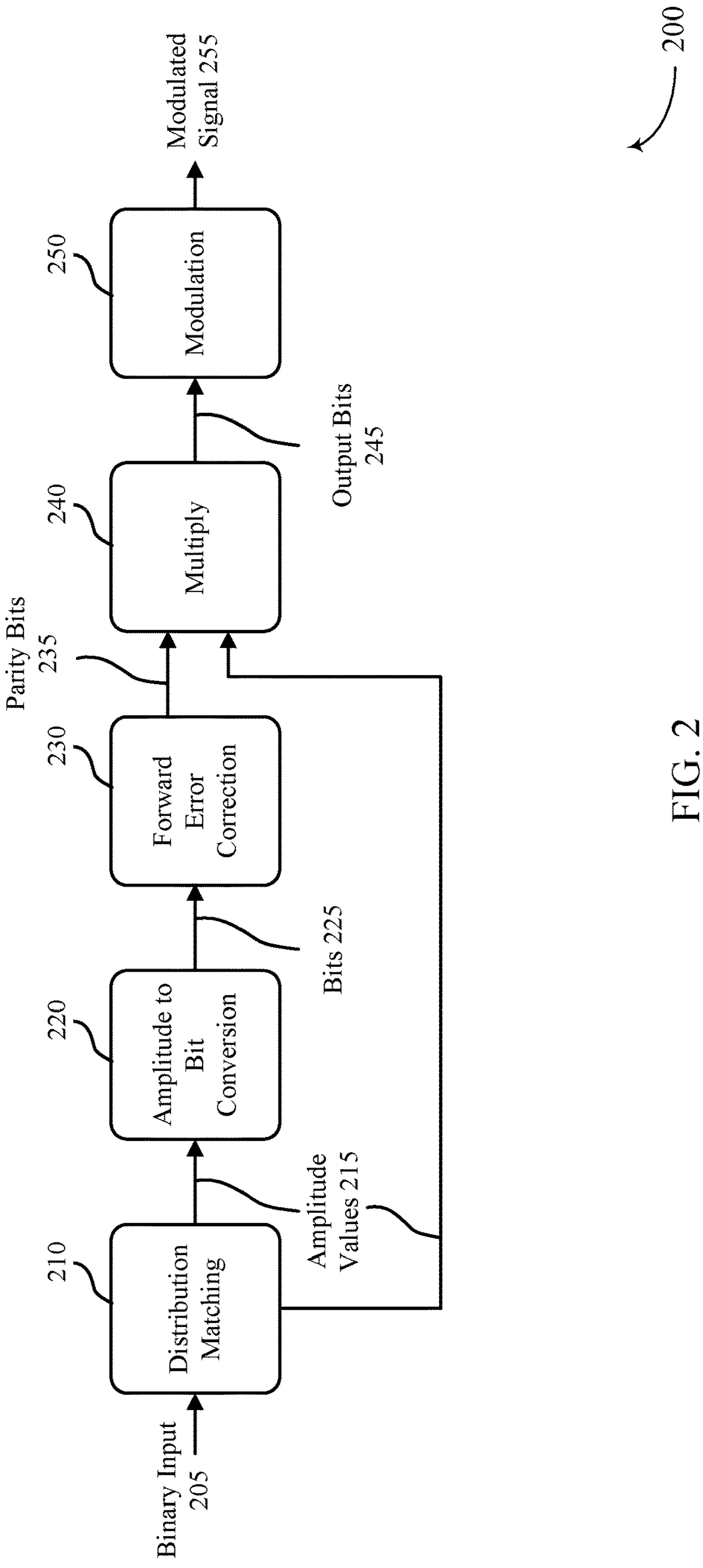
FIG. 2 shows an example of a modulation procedure that supports probabilistic constellation shaping for PAPR reduction in narrow band in accordance with one or more aspects of the present disclosure.
Figure 3:
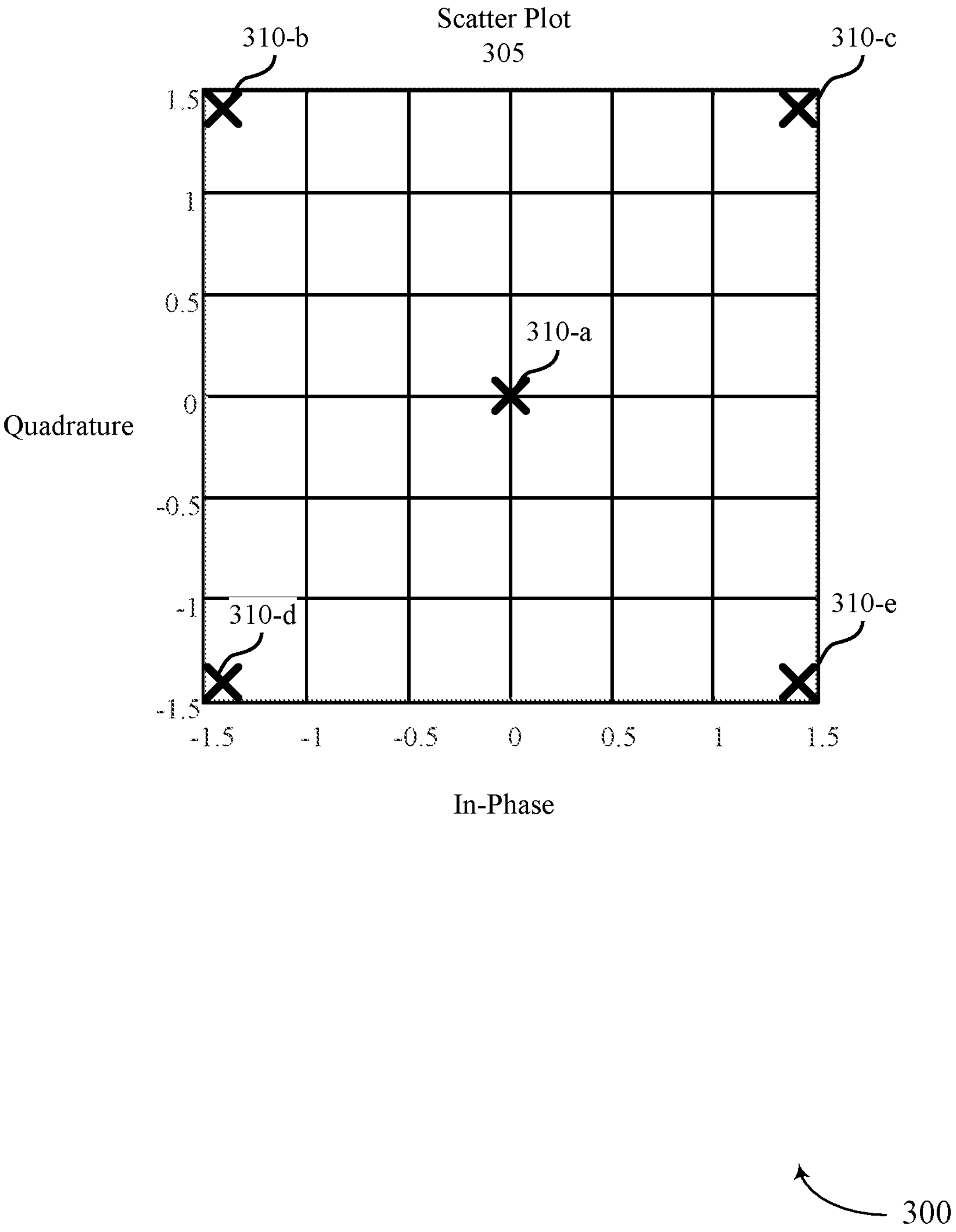
FIG. 3 shows an example of a constellation that supports probabilistic constellation shaping for PAPR reduction in narrow band in accordance with one or more aspects of the present disclosure.

FIGS. 2 and 3 show examples of a modulation procedure 200 and a constellation 300 for signal modulation that support probabilistic constellation shaping for PAPR reduction in narrow band in accordance with one or more aspects of the present disclosure. The modulation procedure 200 and the constellation 300 may illustrate examples for implementing one or more aspects of the wireless communications system 100. For example, the modulation procedure 200 may represent various operations performed at one or more components of a UE 115 or a network entity 105 (e.g., a base station) as described with respect to FIG. 1. Additionally, or alternatively, the constellation 300 may represent a constellation for a signal transmitted or received by a UE 115 or a network entity 105.

In some examples, the modulation procedure 200 and the constellation 300 may support different forms of modulation, including phase shift keying (PSK), such as QPSK, as well as amplitude modulation, such as QAM (e.g., 4-QAM, 16-QAM, 48-QAM, and the like). QPSK or QAM modulation for signals may be defined according to constellation points. For example, constellation points of a constellation (e.g., QAM) may include real points and imaginary points on a complex plane that represent symbols (e.g., each symbol representing one or more bits) to be communicated between devices. Some techniques (e.g., in 5G NR) may utilize QAM by mapping QAM constellation points with equal probability, where coded bits may be mapped to constellation points along I and Q axes for modulation.

In some examples, uniform QAM with equal probability may constrain a capacity of information that can be sent in relation to SNR based on an order (e.g., format) of a QAM modulation scheme. For example, a 4-QAM constellation may constrain a capacity of information to a first, lower quantity, where at a lower SNR value (e.g., in decibels (dB)), a capacity may plateau as SNR increases. However, a 16-QAM may constrain a capacity of information to a higher quantity than that of 4-QAM, where the capacity may plateau at a higher SNR value than that of 4-QAM. Similarly, 64 QAM may have a higher capacity plateauing at a higher SNR value compared to 16-QAM, and 256-QAM and 1024 QAM may have even higher respective capacities per SNR value. In some cases, a Shannon capacity may represent an unconstrained capacity of transmissions, where capacity may continue to increase with respect to SNR without plateauing. The Shannon capacity may be achieved by Gaussian distributed input symbols with long block length. For example, the Shannan capacity may be represented by Equation 1 below:

$$C=\log_2(1+SNR) \tag{1}$$

C may be in bits be per second per Hz. Thus, there may be a gap between each constrained uniform QAM with equal probability and the Shannon capacity.

In some cases, points of a constellation may be weighted differently to approach the Shannon capacity. For example, points of a QAM constellation may be spaced non-uniformly and unequally from each other to weight the points differently, which may be referred to as geometric shaping. Additionally, or alternatively, points of a constellation may be spaced equidistant from each other, but given non-uniform probabilities, which may be referred to as probabilistic shaping.

In some examples, the modulation procedure 200 may represent a sequence of steps or operations for signal modulation using probabilistic shaping. In some examples, a wireless communication device, such as a UE 115 or a network entity 105, may include a binary input 205, and at 210, the device may perform distribution matching on the binary input 205 to produce different amplitude values 215. For example, using a distribution matcher, the device may convert a bit sequence of the binary input 205 into a non-uniformly distributed set of amplitudes corresponding to different symbols based on a constellation. For example, for a quantity of amplitudes, −a, 0, and a, if the amplitude 0 is assigned a ⅔ probability based on a PS constellation, then ⅔ of resulting symbols corresponding to the binary input 205 may be represented by a 0 amplitude. In some examples, the PS constellation may shape the amplitudes based on a constraint, such as an average power constraint to reduce an average transmit power (e.g., Max-Boltzman distribution for power constraint). Additionally, or alternatively, each amplitude may correspond to a quantity of bits based on an order or rate of QAM modulation.

At 220, the device may convert the amplitude values 215 into bits 225, where the bits 225 may be a bit string representation of the amplitude values 215. At 230, the UE 115 may perform forward error correction (FEC) on the bits 225 to generate parity bits 235. The parity bits 235 may represent corresponding signs for the amplitude values 215, where the signs may correspond to the positive and negative axes of the I and Q axes in a constellation diagram. At 240, the device may multiply the distribution, represented by the amplitude values 215, with the parity bits 235 to generate output bits 245 representing correct amplitudes in correct directions of the IQ plane. At 250, the device may modulate a signal based on the output bits 245 to transmit a modulated signal 255. For example, the device may modulate symbol information corresponding to the output bits 245 to obtain an analog signal (e.g., including upconversion to a carrier frequency, digital to analog conversion, etc.).

In some examples, the reverse of the operations described with respect to FIG. 2 may be performed at a second wireless communication device to which the modulated signal 255 is transmitted. For example, the second device, which may be a receiving ULE 115 or a receiving network entity 105, may demodulate a received analog signal, and separate parity bits from amplitude bits using a reverse of the multiply operation at step 240. The second device may then perform a reverse procedure corresponding to the FEC of step 230 and convert resulting bit values back into amplitude values. The second device may then use a distribution de-matcher to convert the amplitude values back into the original binary input 205 based on the corresponding constellation. In some examples, similar processes may be performed for a non-PS constellation (e.g., uniform QAM or geometrically-shaped QAM). For example, for uniform QAM, FEC may be performed on a binary input and converted into symbols corresponding to the bits, and may be modulated in an analog signal.

The constellation 300 of FIG. 3 may represent an example of a PS constellation used to modulate the modulated signal 255 as described with respect to FIG. 2. For example, the constellation 300 may be represented in a scatter plot 305. The scatter plot 305 may include an In-Phase (I) axis and a Quadrature (Q) axis ranging from a negative value to a positive value. For example, the I axis and the Q axis may range from −1.5 to 1.5. The constellation 300 may include one or more constellation points 310. For example, the constellation 300 may have one or more zero constellation points 310-*a*, and one or more corner constellation points 310-*b*, 310-*c*, 310-*d*, and 310-*e*.

In some examples, the constellation 300 may be a PS constellation. For example, the corner points 310-*b* through 310-*e* may be equidistant from the origin (0,0) and from each other, with the constellation points 310-*a* centered at the origin. The constellation points 310 may be assigned different probabilities by having a different quantity of points at each location of the points 310-*a* through 310-*e*.

In some examples, an objective function for probabilistic shaping may be to maximize an achievable throughput given a fixed average power budget, or to alternatively reduce an SNR requirement by reducing an average power (e.g., compared to a rectangular QAM constellation) without sacrificing a distance of constellation points. However, utilizing a QAM or QPSK constellation designed to maximize throughput or to reduce an SNR requirement may not necessarily result in a lower PAPR compared to uniform geometric and uniform probability QAM or QPSK. This may reduce efficiency of a PA, resulting in limitations in overall power output and a reduction in a reliability of transmissions as well.

As described herein, a constellation may be designed to achieve a different objective function, such as reducing PAPR of an output waveform given a family of QAM constellations or a QPSK constellation. By modifying the objective function for a PS constellation to reduce PAPR, an operating point of a PA may be increased (e.g., as lower PAPR results in higher PA efficiency) to increase an output power and thereby increase a reliability of transmissions. This may be particularly effective in scenarios where PA efficiency (e.g., power consumption) is targeted, such as in coverage-limited scenarios (e.g., narrow-band). In some examples, a distribution matcher at a transmitter and a de-matcher at receiver may be used in order to shape constellation points to result in a reduced PAPR waveform as described with respect to FIG. 2. Additionally, or alternatively, a constellation may be designed to achieve a balance between throughput and PAPR.

In a representative example, the constellation 300 of FIG. 3 may represent a PS constellation targeting PAPR reduction or minimization. For example, the constellation 300 may be an example of a PS 16-QPSK constellation with 16 constellation points, and may include 12 zeros at the origin, represented by constellation points 310-*a*, and 4 corner constellation points represented by constellation points 310-*b* through 310-*e*. By thus assigning the constellation points 310-*a* through 310-*e*, the zeros may be assigned a ¾ probability (e.g., 12/16=¾), whereas the corner locations may be assigned a ¼ probability (e.g., 4/16=¼). In some examples, the zeros may represent refraining from transmitting (e.g., transmitting with a power of zero), whereas the corners may represent transmitting at respective amplitudes shown in the scatter plot 305. For example, the corner points may be scaled to $\pm\sqrt{2}\pm\sqrt{2}i$.

By scaling the corner points accordingly, a PAPR may be reduced. For example, assigning the corner points the amplitudes of $\pm\sqrt{2}\pm\sqrt{2}i$ may result in an average power normalized to 1. That is, the average power may be represented by $$\text{Average Power} = \frac{3}{4}\times(0)^2 + 4\times\left(\frac{1}{16}\times\left|\sqrt{2}+\sqrt{2}\,i\right|^2\right) = 1.$$

If a waveform for which the constellation 300 is applied is an OFDM waveform, a single subcarrier may be used for transmission at a power of 1, where for the zeros it may represent transmitting at a power of 0. This design may thus mimic a DC current, with a zero PAPR. In some examples, the constellation 300 may thus represent an example of a single carrier scenario. Additionally, or alternatively, the constellation 300 may represent a design for average power constraint as well.

In some examples, optimizing a PS constellation for reduced PAPR may present advantages for narrow-band signaling. For example, for narrow-band and with QPSK modulation, a non-uniform constellation (NUC), such as a non-uniform QPSK constellation, may outperform a uniform constellation (UC) QPSK counterpart by 2 dB, 0.5 dB, 0.1 dB for 1 RB, 4 RBs, and 12 RBs, respectively, at a 10-3 complementary cumulative distribution function (CCDF) point. That is, as an RB allocation increases (e.g., with more carriers, or RBS), the central limit theorem takes into effect and results in converging PAPR between NUC and UC constellations. Thus, for smaller RB allocation with an OFDM waveform, probabilistic shaping can result in PAPR reduction. In some examples, a UE 115 and a network entity 105 may utilize this reduction in narrow band as described with respect to FIG. 4.

In an example, designing PS constellations to target lower PAPR may not only reduce a PAPR of transmissions, but also increase a throughput to be close to capacity. For example, for relative low data capacity rates (e.g., much less than 1 bit per second per Hertz), an achievable data rate of a PS QPSK constellation may be close to capacity. That is, an achievable data rate may not be lost when compared to uniform QPSK. In some cases, QPSK for reduced PAPR used in low data capacity rates may be similar to a bi-orthogonal constellation (e.g., BPSK) used over frequency tones that asymptotically achieve a capacity of low-power bandwidth-unlimited channel (even without coding). For example, an extreme case may have a PAPR of OdB for a single-tone transmission with all of energy on either all Q or all I axis (e.g., bi-orthogonal), which may achieve a similar PAPR and capacity as ON/OFF transmission (using all power or zero power). Thus, by using probabilistic shaping targeting reducing PAPR, a lower PAPR may also achieve a target throughput by reaching capacity. In some examples, a PS QPSK may be beneficial when used with simpler FEC or FECs with a smaller packet size compared to FEC applied to uniform QPSK. Also, this allows a PA to be pushed further for greater throughput.

Figure 4:
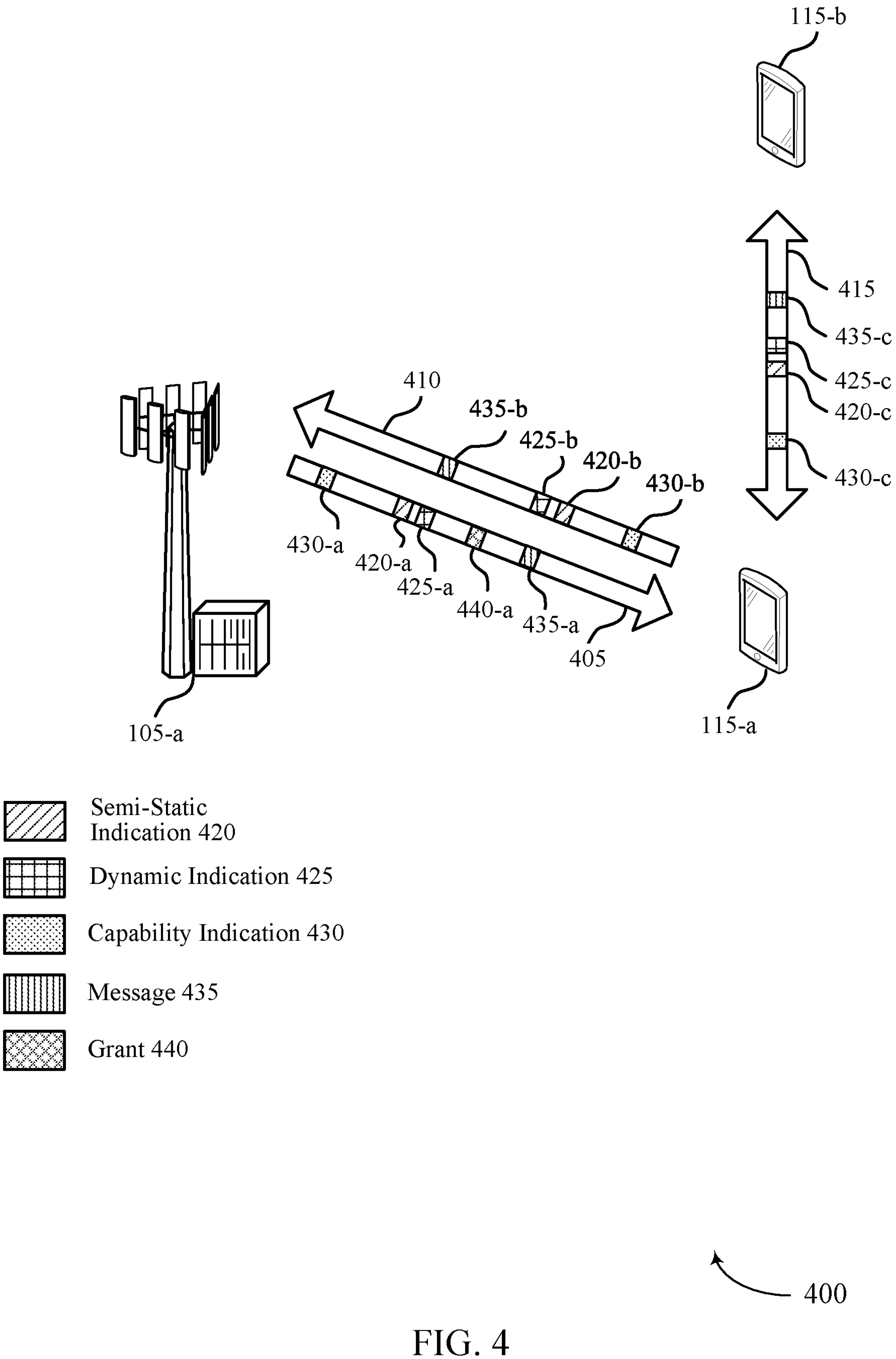
FIG. 4 shows an example of a wireless communications system that supports probabilistic constellation shaping for PAPR reduction in narrow band in accordance with one or more aspects of the present disclosure.

FIG. 4 shows an example of a wireless communications system 400 that supports probabilistic constellation shaping for PAPR reduction in narrow band in accordance with one or more aspects of the present disclosure. The wireless communications system 400 may illustrate examples for implementing one or more aspects of the wireless communications system 100, the modulation procedure 200, and the constellation 300. For example, the wireless communications system 400 may include a network entity 105-*a*, a UE

115-*a*, and a UE 115-*b*, which may represent a network entity 105 and one or more UEs 115 as described with respect to FIGS. 1-3. In some examples, the UE 115-*a* may be in communication with the network entity 105-*a* using a downlink communication link 405 and an uplink communication link 410 which may represent one or more a communication links 125 as described with respect to FIG. 1. Similarly, the UE 115-*a* may be in communication with the UE 115-*b* using a sidelink communication link 415, which may be an example of a D2D communication link 135 described with respect to FIG. 1. In some examples, the wireless communications system 400 may represent various signaling configurations for targeting lower PAPR in probabilistic shaping of constellations.

For example, the network entity 105-*a*, the UE 115-*a*, and the UE 115-*b*, or any combination thereof, may support PS constellations targeting PAPR reduction for transmissions. For example, in OFDM, or CP-OFDM, a base constellation for one or more transmissions may include constellation points of QPSK or QAM constellations with different probabilities as described with respect to FIGS. 2 and 3. The base constellation may also include one or more zeros (e.g., constellation points with zero power transmission on a respective resource element). In some examples, a PS constellation may be applicable depending on a direction and source of transmission. For example, the network entity 105-*a* or the UE 115-*a* may determine to use a PS constellation targeting reduced PAPR for downlink or uplink in Uu using the uplink communication link 405 or the downlink communication link 410, respectively. Additionally, or alternatively, the UE 115-*a* may determine to use a PS constellation targeting reduced PAPR for sidelink communications over the sidelink communication link 415 with the UE 115-*b*.

In some examples, a PS constellation targeting reduced PAPR may be applicable depending on a type or purpose of transmission. For example, the UE 115-*a* or the network entity 105-*a* may determine to use a reduced PAPR PS constellation for control messaging, such as physical uplink control channel (PUCCH) messages, so as to increase a reliability of control message transmissions. Additionally, or alternatively, reduced PAPR PS constellations may be applied depending on a frequency range/band or a size of a BWP or a subcarrier spacing. For example, reduced PAPR PS constellations may be used in narrow band (e.g., having less than a certain quantity of RBs) OFDM, including CP-OFDM, or for single carrier applications (e.g., single carrier FDMA or single carrier QAM) as described herein. In some cases, PAPR reduction may be used in higher order QAM modulations with a single-carrier waveform.

In some examples, before transmitting a message in accordance with a reduced PAPR PS constellation (e.g., targeting low or reduced PAPR), a device may transmit an indication of the transmission. For example, a wireless device (e.g., the UE 115-*a* or the network entity 105-*a*) may transmit an indication to a second wireless device (e.g., the UE 115-*a*, the network entity 105-*a* or the UE 115-*b*) notifying the second wireless device of a later transmission using a PS constellation targeting reduced PAPR. In some examples, the indication may include an index corresponding a PS constellation. For example, the second device may include a table (preconfigured or configured by RRC, or indicated in dynamic signaling) of different sets of constellation values, where the index may indicate a chosen set of constellation values corresponding to a reduced PAPR PS constellation for a later transmission. Additionally, or alternatively, the indication may include an indication of an RB allocation corresponding to the PS allocation. For example, the second device may include a table mapping one or more RBs to different PS constellations and corresponding sets of constellation values, may receive an indication of the RBs, and may select a corresponding PS constellation (e.g., RB to PS constellation table configured by RRC) for reception of a message.

Tables for RBs and constellations may be dependent on corresponding frequency bands and orders of modulation. For example, a frequency band for transmissions may change over time (e.g., higher frequency bands may be used with a higher spectral efficiency while lower bands may be associated with a lower order of modulation), where RB and/or constellation mapping tables may change based on active frequency bands.

In some examples, the network entity 105-*a* may transmit an indication in downlink to the UE 115-*a* (e.g., via the downlink communication link 405) that the network entity 105-*a* is going to transmit a PS constellation targeting reduced PAPR. For example, the network entity 105-*a* may transmit a semi-static indication 420-*a*, such as in an RRC message (e.g., Layer 3) indicating the PS constellation. Additionally, or alternatively, the network entity 105-*a* may transmit a dynamic indication 425, such as a dynamic indication 425-*a*, to the UE 115-*a*, such as a DCI indication (e.g., Layer 1) or a MAC control element (MAC-CE) indication (e.g., Layer 2) indicating the PS constellation. In some examples, the network entity 105-*a* may use semi-static or dynamic indications based on a frequency of how often PS constellations are used/chosen for messages. As described, the semi-static indication 420-*b*, the dynamic indication 425-*b*, or both, may include an index of a PS constellation or an indication of one or more RBs corresponding to the PS constellation.

By way of another example, the UE 115-*a* may transmit an indication in uplink to the network entity 105-*a* (e.g., via the uplink communication link 410) that the UE 115-*a* is going to transmit using a PS constellation targeting reduced PAPR. For example, the UE 115-*a* may transmit a semi-static indication 420-*b* (e.g., RRC) or a dynamic indication 425-*b* (e.g., UCI or MAC-CE) to the network entity 105-*a* indicating a PS constellation. Similarly, the semi-static indication 420-*b*, the dynamic indication 425-*b*, or both, may include an index of the PS constellation (e.g., an index) or an indication of one or more RBs.

Additionally, or alternatively, a device may include a flag in an indication enabling the use of PS constellations targeting reduced PAPR, or indicating that the device is switching from using one or more constellations (e.g., uniform and unweighted, geometrically-shaped) to using a PS constellation targeting reduced PAPR. For example, the network entity 105-*a* may include an "enable" or "switching" flag in the semi-static indication 420-*a* (e.g., in RRC content) or in the dynamic indication 425-*a* (e.g., in DCI or MAC-CE content). Similarly, the UE 115-*a* may include an "enable" or "switching" flag in the semi-static indication 420-*b* (e.g., in RRC content) or in the dynamic indication 425-*b* (e.g., in UCI or MAC-CE content). In some examples, an "enable" flag may enable PS constellation use for OFDM (e.g., CP-OFDM).

Based on receiving an indication of a PS constellation, a second device may determine which constellation to use for decoding a message. Additionally, or alternatively, by receiving an "enable" flag in an indication, a second device may determine whether or not a PS constellation will be used and prepare to decode a constellation accordingly. If the "enable" flag is set to "disabled," the receiving device may refrain from decoding a transmission or may use a different constellation, or may refrain from monitoring for transmissions. In some cases, a device transmitting the indication may transmit one of an indication of the PS constellation, an indication of one or more RBs, an indication of a flag, or any combination thereof to the second device.

In some examples, transmission using PS constellations targeting reduced PAPR may be based on a resource allocation as described with respect to FIGS. 2 and 3 (e.g., for narrow-band). For example, for an OFDM waveform with narrow-band RB allocation, NUCs may result in signal gain resulting from PAPR reduction. Thus, a device (e.g., a transmitting device) may determine whether to use a PS constellation targeting reduced PAPR for a message 435 based on a quantity of RBs. For example, if a quantity of RBs fails to satisfy a threshold (e.g., is less than a threshold), a device (e.g., the network entity 105-*a* or the UE 115-*a*) may select to use a PS constellation targeting minimized or lower PAPR for transmissions. However, if the quantity of RBs satisfies the threshold (e.g., is greater than or equal to the threshold), the device may select a different constellation (e.g., as a PS constellation at higher RBs may result in similar PAPR to a constellation targeting another objective function). In some cases, the device may use reduced PAPR PS constellations for power limited scenarios or control signaling as described herein.

In some examples, a second device (e.g., a receiving device) may indicate a capability to process a PS constellation through capability information signaling. For example, the UE 115-*a* may transmit, to the network entity 105-*a*, a capability indication 430-*b* indicating a capability to process (e.g., decode at receiver side as described with respect to FIG. 2) a PS constellation. In some examples, the UE 115-*a* may transmit the capability indication 430-*b* dependent on whether UE 115-*a* is equipped with a distribution de-matcher. Based on the capability indication 430-*b*, the network entity 105-*a* may determine whether to transmit a message 435-*a* in accordance with a reduced PAPR PS constellation if the UE 115-*a* is capable of decoding messages according to reduced PAPR PS constellations, or using another constellation supported by the UE 115-*a* if reduced PAPR PS constellations are not supported by the UE 115-*a*. Similarly, the network entity 105-*a* may transmit a capability indication 430-*a* to the UE 115-*a*, where the UE 115-*a* may transmit a message 435-*b* in accordance with a supported constellation. In some examples, the receiving device may transmit the capability indication before receiving a semi-static indication 420 or a dynamic indication 430 of a later PS constellation message.

In some examples, a device may transmit a message 435 in accordance with the PS constellation after transmitting the indication and using resources indicated in a grant 440. For example, after transmitting the semi-static indication 420-*a*, the dynamic indication 425-*a*, or both, the network entity 105-*a* may transmit a grant 440-*a* indicating resources for receiving the message 435-*a*. The network entity 105-*a* may then transmit the message 435-*a* modulated according to the PS constellation that the network entity 105-*a* previously indicated to the UE 115-*a*. Similarly, the grant 440-*a* may indicate resources for transmitting a message 435, and the UE 115-*a* may transmit the message 435-*b* indicating one or more symbols of information to the network entity 105-*a* by modulating the message according to the PS constellation as described with respect to FIG. 2. In some examples, the message 435-*a* or the 435-*b* may be transmitted over multiple carriers in a bandwidth (e.g., for narrow-band), or using a single carrier.

In some examples, the signaling described herein may be performed in sidelink communication between two UEs 115. For example, the UE 115-*a* may transmit, to the UE 115-*b* via the sidelink communication link 415 (or vice versa), a semi-static indication 420-*c*, a dynamic indication 425-*c*, or both, may receive a capability indication 430-*c*, and may transmit a message 435-*c*, or vice-versa. In some examples, the UE 115-*a* (or the UE 115-*b*) may transmit the message 435-*c* using one or more resources indicated in a received grant 440.

Figure 5:
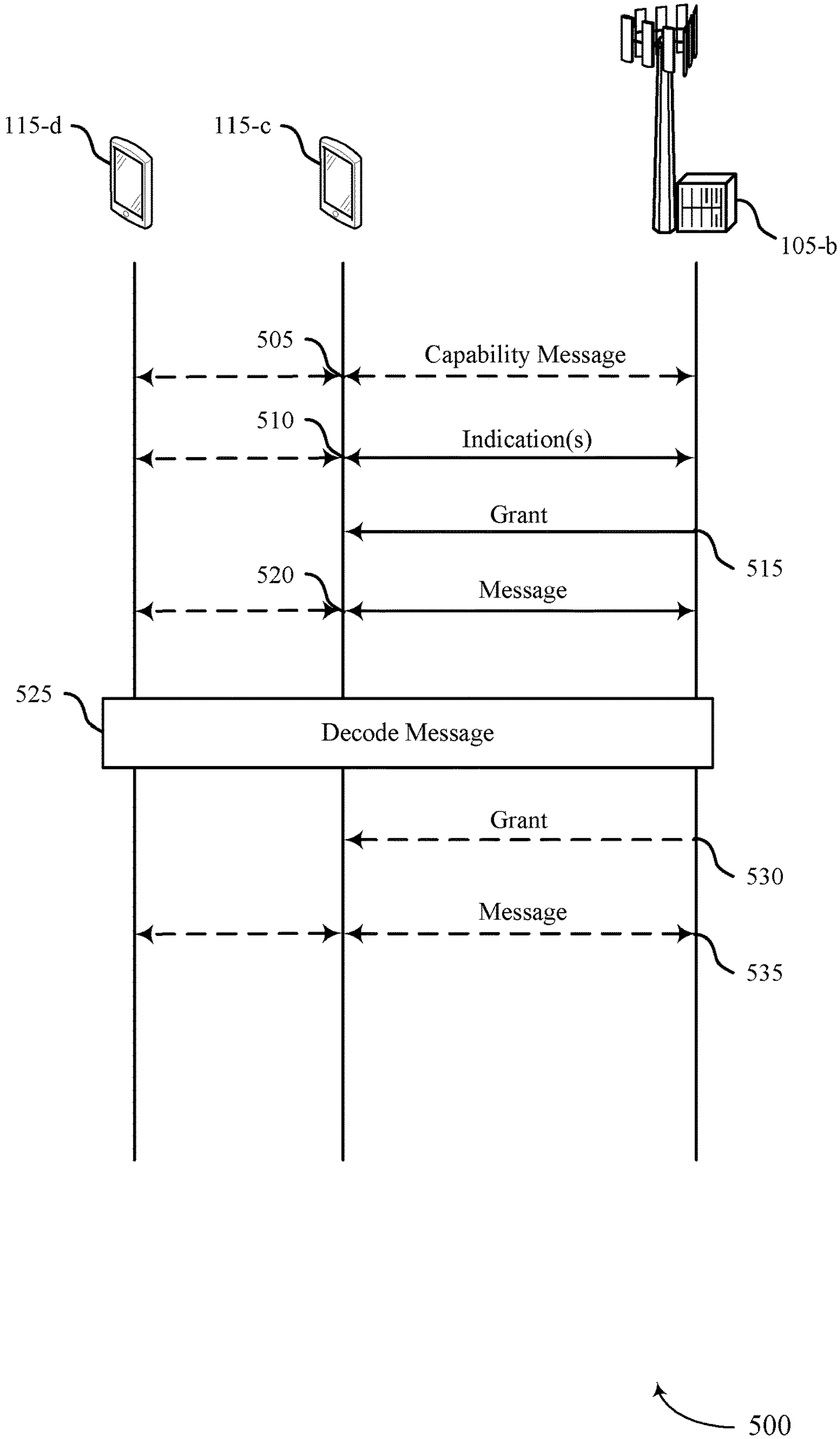
FIG. 5 shows an example of a process flow that supports probabilistic constellation shaping for PAPR reduction in narrow band in accordance with one or more aspects of the present disclosure.

FIG. 5 shows an example of a process flow 500 that supports probabilistic constellation shaping for PAPR reduction in narrow band in accordance with one or more aspects of the present disclosure. In some examples, the process flow 500 may implement aspects of the wireless communications systems 100 and 400, the modulation procedure 200, and the constellation 300. For example, the process flow 500 may illustrate an example of a network entity 105-*b*, a UE 115-*c*, and a UE 115-*d*, which may represent the network entities 105 and the UEs 115 described with respect to FIGS. 1-4. In some examples, the process flow 500 may demonstrate various implementations for targeting lower PAPR in probabilistic shaping of constellations.

Alternative examples of the following may be implemented, where some processes are performed in a different order than described or are not performed. In some cases, processes may include additional features not mentioned below, or further processes may be added.

At 505, a capability message may be optionally received by a wireless communication device. For example, the network entity 105-*b* may receive, and the UE 115-*c* may transmit, a capability message indicating a capability to decode a PS constellation as described with respect to FIG. 4. Similarly, the UE 115-*c* may receive a capability message transmitted by the network entity 105-*b*. In some examples, the UE 115-*c* may receive a capability message from the UE 115-*d*, or vice-versa, using sidelink signaling.

At 510, an indication may be transmitted by a wireless communication device. For example, the network entity 105-*b* may transmit in downlink, and the UE 115-*c* may receive, an indication of the PS constellation being enabled for transmission (or reception) of one or more messages. In some examples, the indication may be a flag in a downlink RRC message or a flag in a DCI message or in a MAC-CE message. Additionally, or alternatively, the network entity 105-*b* may transmit a second indication of the PS constellation. For example, the second indication may be an index corresponding to the PS constellation. Similarly, the UE 115-*c* may transmit an indication of the PS constellation being enabled for messaging, a second indication of the PS constellation (e.g., an index), or both, to the network entity 105-*b* in uplink. For example, the indication may be a flag in an RRC message, in a UCI message, or in a MAC-CE message. Additionally, or alternatively, the UE 115-*c* and the UE 115-*d* may exchange one or more indications in sidelink.

At 515, a grant may be communicated between wireless communication devices. For example, the network entity 105-*b* may transmit, and the UE 115-*c* may receive, a grant indicating a set of resources including one or more resource blocks for transmission or reception of a message of the one or more messages. In some examples, the UE 115-*d* may receive a grant from the network entity 105-*b* indicating resources for use in uplink, downlink, or sidelink communications.

At 520, the message may be transmitted by a wireless communication device. For example, the network entity 105-*b* may transmit, and the UE 115-*c* may receive, the message over the set of resources in accordance with the PS constellation based at least in part on a quantity of the one or more resource blocks of the set of resources failing to satisfy a threshold quantity of resource blocks. In some examples, the message may be a control information message.

In some examples, transmitting the message in accordance with the PS constellation may be based on receiving the capability message. Additionally, or alternatively, transmitting the message in accordance with the PS constellation may be based on transmitting the indication, transmitting the second indication, or both. In some cases, transmitting the message may include transmitting a downlink message over the set of resources based on transmitting the grant. Similarly, the UE 115-*c* may transmit a message to the network entity 105-*b* in uplink. For example, the UE 115-*c* may transmit an uplink message over the set of resources based on receiving the grant. Additionally, or alternatively, the UE 115-*c* may transmit a message to the UE 115-*d* using grant-indicated resources, or vice-versa.

At 525, the message may be decoded. For example, the UE 115-*c* may decode a message using a reverse of the steps shown in FIG. 2 to separate parity bits from information bits and may use a distribution de-matcher to decode the bits in accordance with the PS constellation. In some examples, the UE 115-*c* may decode the message based on receiving the indication (or the second indication) and the message transmitted by the network entity 105-*b*. In some examples, the UE 115-*c* may decode the message based on transmitting a capability message at 505. Similarly, the network entity 105-*b* may decode a message transmitted by the UE 115-*c*. The UE 115-*d* may also decode a message transmitted by the UE 115-*c*, or vice-versa.

In some examples, wireless communication devices may communicate one or more additional grants or messages. For example, at 530, the network entity 105-*b* may transmit a second grant to the UE 115-*c* for a second message indicating a second set of resources including one or more second resource blocks. At 535, the network entity 105-*b* may transmit, and the UE 115-*c* may receive, the second message over the second set of resources in accordance with a constellation different from the PS constellation based on a quantity of the one or more second resource blocks of the second set of resources satisfying the threshold quantity of resource blocks. Similarly, the UE 115-*c* may transmit a second message to the network entity 105-*b* in uplink. The UE 115-*c* may also transmit a second message to the UE 115-*d*, or vice-versa.

Figure 6:
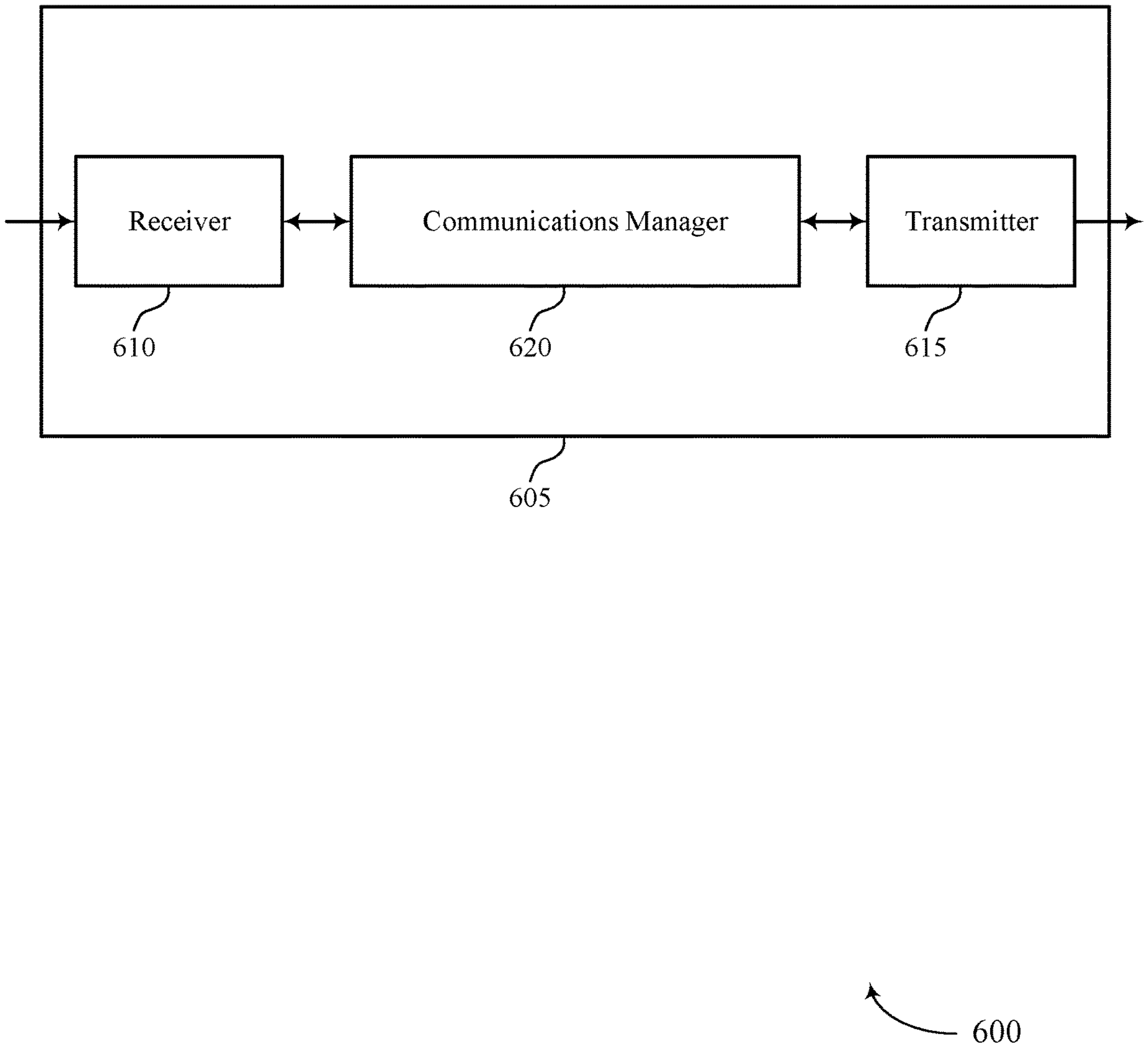
FIGS. 6 and 7 show block diagrams of devices that support probabilistic constellation shaping for PAPR reduction in narrow band in accordance with one or more aspects of the present disclosure.

FIG. 6 shows a block diagram 600 of a device 605 that supports probabilistic constellation shaping for PAPR reduction in narrow band in accordance with one or more aspects of the present disclosure. The device 605 may be an example of aspects of a UE 115 or a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include one or more processors, which may be coupled with one or more memories, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to probabilistic constellation shaping for PAPR reduction in narrow band). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to probabilistic constellation shaping for PAPR reduction in narrow band). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of probabilistic constellation shaping for PAPR reduction in narrow band as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions stored in the one or more memories).

Additionally, or alternatively, the communications manager 620, the receiver 610, the transmitter 615, or various combinations or components thereof may be implemented in code (e.g., as communications management software or firmware) executed by one or more processors. If implemented in code executed by one or more processors (e.g., processor-executable code), the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication by a wireless communication device in accordance with examples as disclosed herein. For example, the communications manager 620 is capable of, configured to, or operable to support a means for transmitting an indication of a PS constellation being enabled for transmission of one or more messages. The communications manager 620 is capable of, configured to, or operable to support a means for communicating a grant indicating a set of resources including one or more resource blocks for transmission of a message of the one or more messages. The communications manager 620 is capable of, configured to, or operable to support a means for transmitting the message over the set of resources in accordance with the PS constellation based on a quantity of the one or more resource blocks of the set of resources failing to satisfy a threshold quantity of resource blocks.

Additionally, or alternatively, the communications manager 620 may support wireless communication by a wireless communication device in accordance with examples as disclosed herein. For example, the communications manager 620 is capable of, configured to, or operable to support a means for receiving an indication of a PS constellation being enabled for reception of one or more messages. The communications manager 620 is capable of, configured to, or operable to support a means for communicating a grant indicating a set of resources including one or more resource blocks for receiving a message of the one or more messages. The communications manager 620 is capable of, configured to, or operable to support a means for receiving the message over the set of resources in accordance with the PS constellation based on a quantity of the one or more resource blocks of the set of resources failing to satisfy a threshold quantity of resource blocks.

By including or configuring the communications manager 620 in accordance with examples as described herein, the device 605 (e.g., one or more processors controlling or otherwise coupled with the receiver 610, the transmitter 615, the communications manager 620, or a combination thereof) may support techniques for reduced power consumption and more efficient utilization of communication resources by utilizing constellations for PAPR reduction to increase a reliability of communications and increase throughput.

Figure 7:
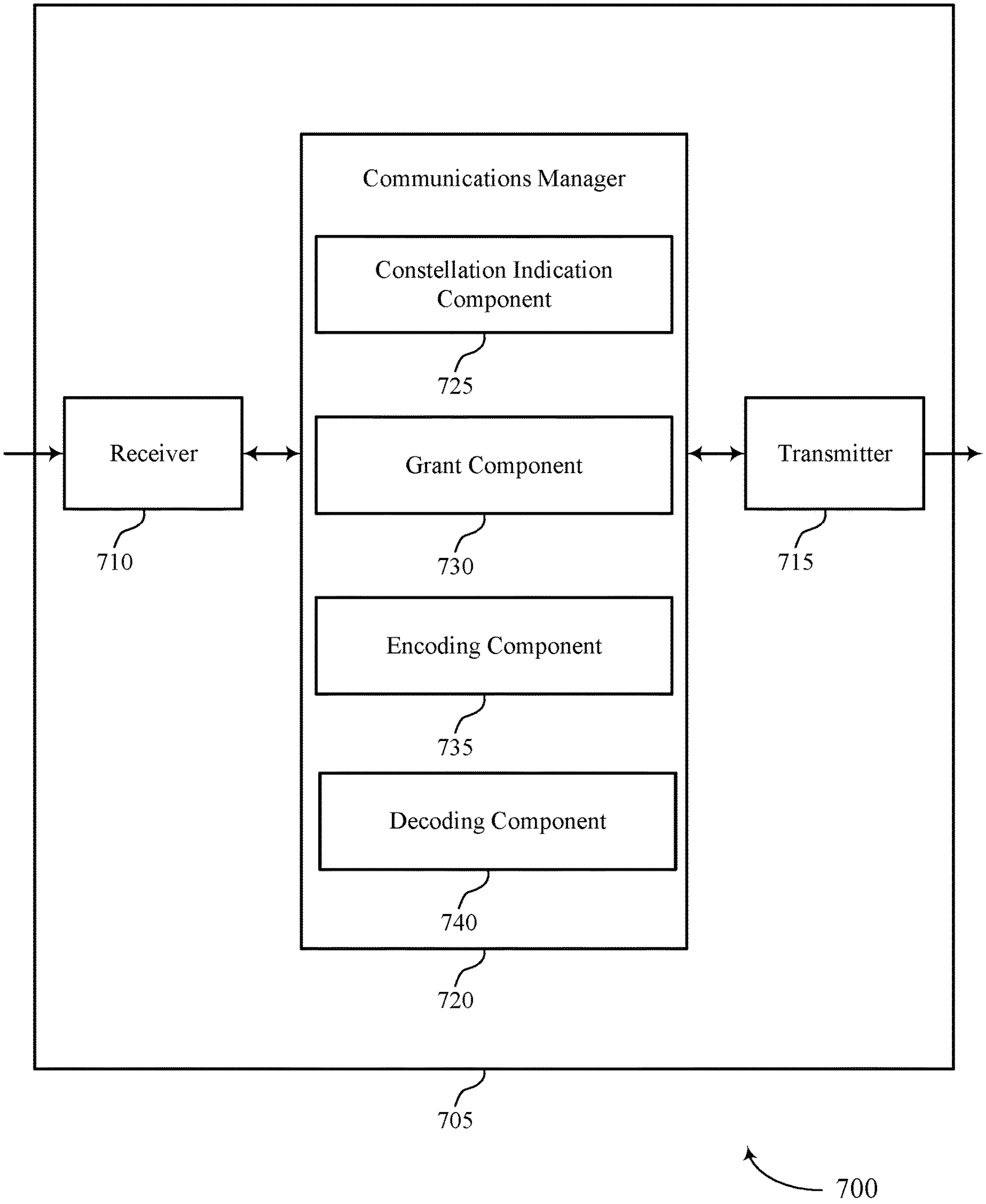

FIG. 7 shows a block diagram 700 of a device 705 that supports probabilistic constellation shaping for PAPR reduction in narrow band in accordance with one or more aspects of the present disclosure. The device 705 may be an example of aspects of a device 605, a UE 115, or a network entity 105 as described herein. The device 705 may include a receiver 710, a transmitter 715, and a communications manager 720. The device 705, or one or more components of the device 705 (e.g., the receiver 710, the transmitter 715, and the communications manager 720), may include one or more processors, which may be coupled with one or more memories, to, individually or collectively, support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to probabilistic constellation shaping for PAPR reduction in narrow band). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to probabilistic constellation shaping for PAPR reduction in narrow band). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of probabilistic constellation shaping for PAPR reduction in narrow band as described herein. For example, the communications manager 720 may include a constellation indication component 725, a grant component 730, an encoding component 735, a decoding component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication by a wireless communication device in accordance with examples as disclosed herein. The constellation indication component 725 is capable of, configured to, or operable to support a means for transmitting an indication of a PS constellation being enabled for transmission of one or more messages. The grant component 730 is capable of, configured to, or operable to support a means for communicating a grant indicating a set of resources including one or more resource blocks for transmission of a message of the one or more messages. The encoding component 735 is capable of, configured to, or operable to support a means for transmitting the message over the set of resources in accordance with the PS constellation based on a quantity of the one or more resource blocks of the set of resources failing to satisfy a threshold quantity of resource blocks.

Additionally, or alternatively, the communications manager 720 may support wireless communication by a wireless communication device in accordance with examples as disclosed herein. The constellation indication component 725 is capable of, configured to, or operable to support a means for receiving an indication of a PS constellation being enabled for reception of one or more messages. The grant component 730 is capable of, configured to, or operable to support a means for communicating a grant indicating a set of resources including one or more resource blocks for receiving a message of the one or more messages. The decoding component 740 is capable of, configured to, or operable to support a means for receiving the message over the set of resources in accordance with the PS constellation based on a quantity of the one or more resource blocks of the set of resources failing to satisfy a threshold quantity of resource blocks.

Figure 8:
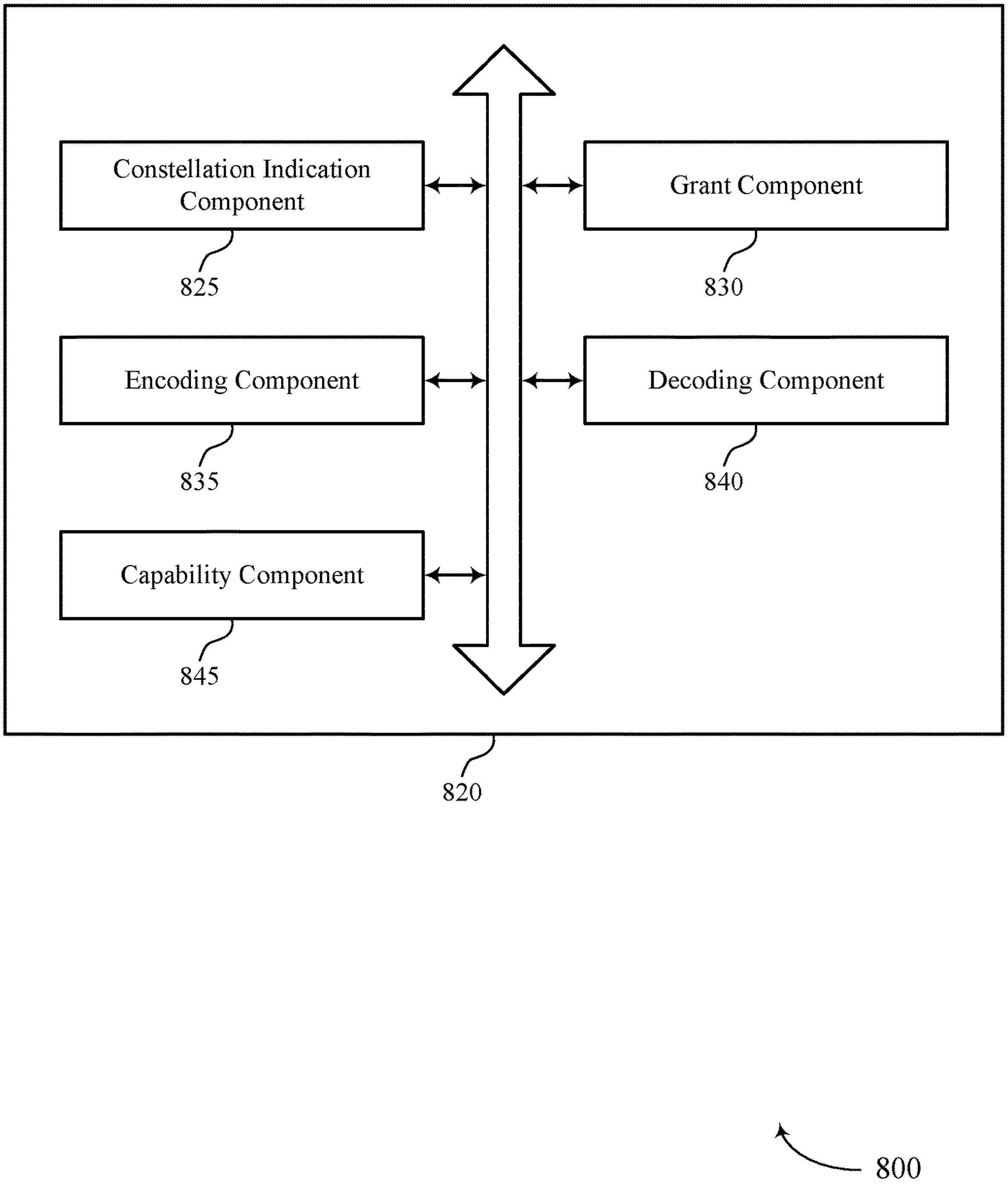
FIG. 8 shows a block diagram of a communications manager that supports probabilistic constellation shaping for PAPR reduction in narrow band in accordance with one or more aspects of the present disclosure.

FIG. 8 shows a block diagram 800 of a communications manager 820 that supports probabilistic constellation shaping for PAPR reduction in narrow band in accordance with one or more aspects of the present disclosure. The communications manager 820 may be an example of aspects of a communications manager 620, a communications manager 720, or both, as described herein. The communications manager 820, or various components thereof, may be an example of means for performing various aspects of probabilistic constellation shaping for PAPR reduction in narrow band as described herein. For example, the communications manager 820 may include a constellation indication component 825, a grant component 830, an encoding component 835, a decoding component 840, a capability component 845, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication by a wireless communication device in accordance with examples as disclosed herein. The constellation indication component 825 is capable of, configured to, or operable to support a means for transmitting an indication of a PS constellation being enabled for transmission of one or more messages. The grant component 830 is capable of, configured to, or operable to support a means for communicating a grant indicating a set of resources including one or more resource blocks for transmission of a message of the one or more messages. The encoding component 835 is capable of, configured to, or operable to support a means for transmitting the message over the set of resources in accordance with the PS constellation based on a quantity of the one or more resource blocks of the set of resources failing to satisfy a threshold quantity of resource blocks.

In some examples, the constellation indication component 825 is capable of, configured to, or operable to support a means for transmitting a second indication of the PS constellation, where transmitting the message in accordance with the PS constellation is based on transmitting the second indication. In some examples, the second indication includes an index corresponding to the PS constellation.

In some examples, the capability component 845 is capable of, configured to, or operable to support a means for receiving a capability message indicating a capability to decode the PS constellation, where transmitting the message in accordance with the PS constellation is based on receiving the capability message.

In some examples, the grant component 830 is capable of, configured to, or operable to support a means for communicating a second grant for a second message indicating a second set of resources including one or more second resource blocks. In some examples, the encoding component 835 is capable of, configured to, or operable to support a means for transmitting the second message over the second set of resources in accordance with a constellation different from the PS constellation based on a quantity of the one or more second resource blocks of the second set of resources satisfying the threshold quantity of resource blocks.

In some examples, the wireless communication device includes a UE. In some examples, communicating the grant includes receiving the grant indicating the set of resources. In some examples, transmitting the message includes transmitting an uplink message over the set of resources based on receiving the grant.

In some examples, the wireless communication device includes a network entity. In some examples, communicating the grant includes transmitting the grant indicating the set of resources. In some examples, transmitting the message includes transmitting a downlink message over the set of resources based on transmitting the grant. In some examples, the indication includes a flag in a DCI message, in a UCI message, or in a MAC-CE message. In some examples, the indication includes a flag in an RRC message. In some examples, the message includes a control information message.

Additionally, or alternatively, the communications manager 820 may support wireless communication by a wireless communication device in accordance with examples as disclosed herein. In some examples, the constellation indication component 825 is capable of, configured to, or operable to support a means for receiving an indication of a PS constellation being enabled for reception of one or more messages. In some examples, the grant component 830 is capable of, configured to, or operable to support a means for communicating a grant indicating a set of resources including one or more resource blocks for receiving a message of the one or more messages. In some examples, the decoding component 840 is capable of, configured to, or operable to support a means for receiving the message over the set of resources in accordance with the PS constellation based on a quantity of the one or more resource blocks of the set of resources failing to satisfy a threshold quantity of resource blocks.

In some examples, the constellation indication component 825 is capable of, configured to, or operable to support a means for receiving a second indication of the PS constellation, where receiving the message in accordance with the PS constellation is based on receiving the second indication. In some examples, the second indication includes an index corresponding to the PS constellation.

In some examples, the decoding component 840 is capable of, configured to, or operable to support a means for decoding the message in accordance with the PS constellation based on receiving the indication and the message.

In some examples, the capability component 845 is capable of, configured to, or operable to support a means for transmitting a capability message indicating a capability to decode the PS constellation, where receiving the message in accordance with the PS constellation and decoding the message is based on transmitting the capability message.

In some examples, the grant component 830 is capable of, configured to, or operable to support a means for communicating a second grant for a second message indicating a second set of resources including one or more second resource blocks. In some examples, the decoding component 840 is capable of, configured to, or operable to support a means for receiving the second message over the second set of resources in accordance with a constellation different from the PS constellation based on a quantity of the one or more second resource blocks of the second set of resources satisfying the threshold quantity of resource blocks.

In some examples, the wireless communication device includes a UE. In some examples, communicating the grant includes receiving the grant indicating the set of resources.

In some examples, receiving the message includes receiving a downlink message over the set of resources based on receiving the grant.

In some examples, the wireless communication device includes a network entity. In some examples, communicating the grant includes transmitting the grant indicating the set of resources. In some examples, receiving the message includes receiving an uplink message over the set of resources based on transmitting the grant. In some examples, the indication includes a flag in a DCI message, in a UCI message, or in a MAC-CE message. In some examples, the indication includes a flag in an RRC message. In some examples, the message includes a control information message.

Figure 9:
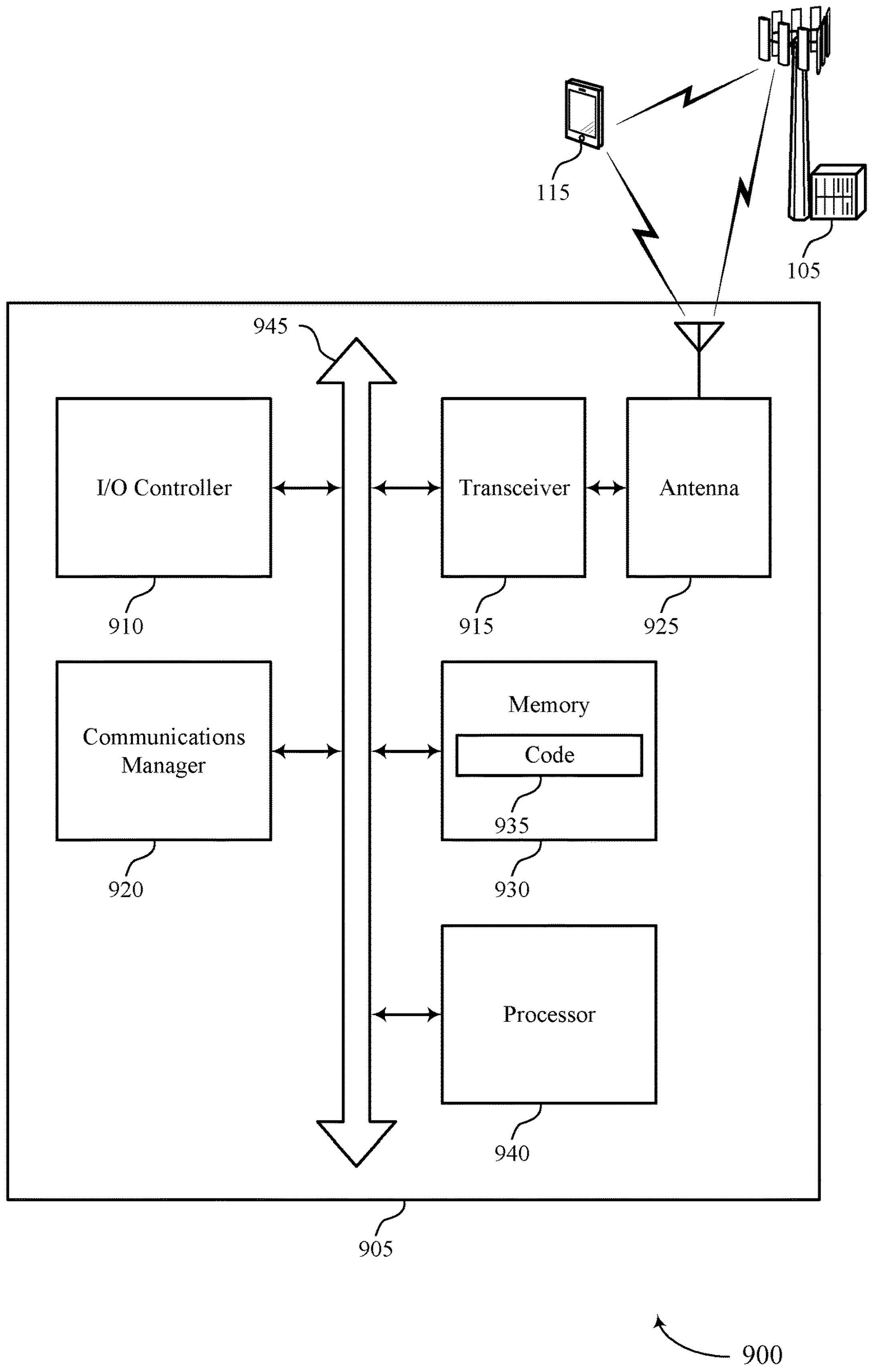
FIG. 9 shows a diagram of a system including a UE that supports probabilistic constellation shaping for PAPR reduction in narrow band in accordance with one or more aspects of the present disclosure.

FIG. 9 shows a diagram of a system 900 including a device 905 that supports probabilistic constellation shaping for PAPR reduction in narrow band in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930 (e.g., one or more memories 930), code 935 (e.g., processor executable-code), and at least one processor 940 (e.g., one or more processors 940). These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting probabilistic constellation shaping for PAPR reduction in narrow band). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein.

The communications manager 920 may support wireless communication by a wireless communication device in accordance with examples as disclosed herein. For example, the communications manager 920 is capable of, configured to, or operable to support a means for transmitting an indication of a PS constellation being enabled for transmission of one or more messages. The communications manager 920 is capable of, configured to, or operable to support a means for communicating a grant indicating a set of resources including one or more resource blocks for transmission of a message of the one or more messages. The communications manager 920 is capable of, configured to, or operable to support a means for transmitting the message over the set of resources in accordance with the PS constellation based on a quantity of the one or more resource blocks of the set of resources failing to satisfy a threshold quantity of resource blocks.

Additionally, or alternatively, the communications manager 920 may support wireless communication by a wireless communication device in accordance with examples as disclosed herein. For example, the communications manager 920 is capable of, configured to, or operable to support a means for receiving an indication of a PS constellation being enabled for reception of one or more messages. The communications manager 920 is capable of, configured to, or operable to support a means for communicating a grant indicating a set of resources including one or more resource blocks for receiving a message of the one or more messages. The communications manager 920 is capable of, configured to, or operable to support a means for receiving the message over the set of resources in accordance with the PS constellation based on a quantity of the one or more resource blocks of the set of resources failing to satisfy a threshold quantity of resource blocks.

By including or configuring the communications manager 920 in accordance with examples as described herein, the device 905 may support techniques for improved communication reliability (e.g., due to decreased PAPR), longer battery life, improved coordination between devices, and more efficient utilization of communication resources due to higher throughput by utilizing constellations for PAPR reduction (e.g., in narrow-band) and various signaling as described herein.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of probabilistic constellation shaping for PAPR reduction in narrow band as described herein, or the at least one processor 940 and the at least one memory 930 may be otherwise configured to, individually or collectively, perform or support such operations.

Figure 10:
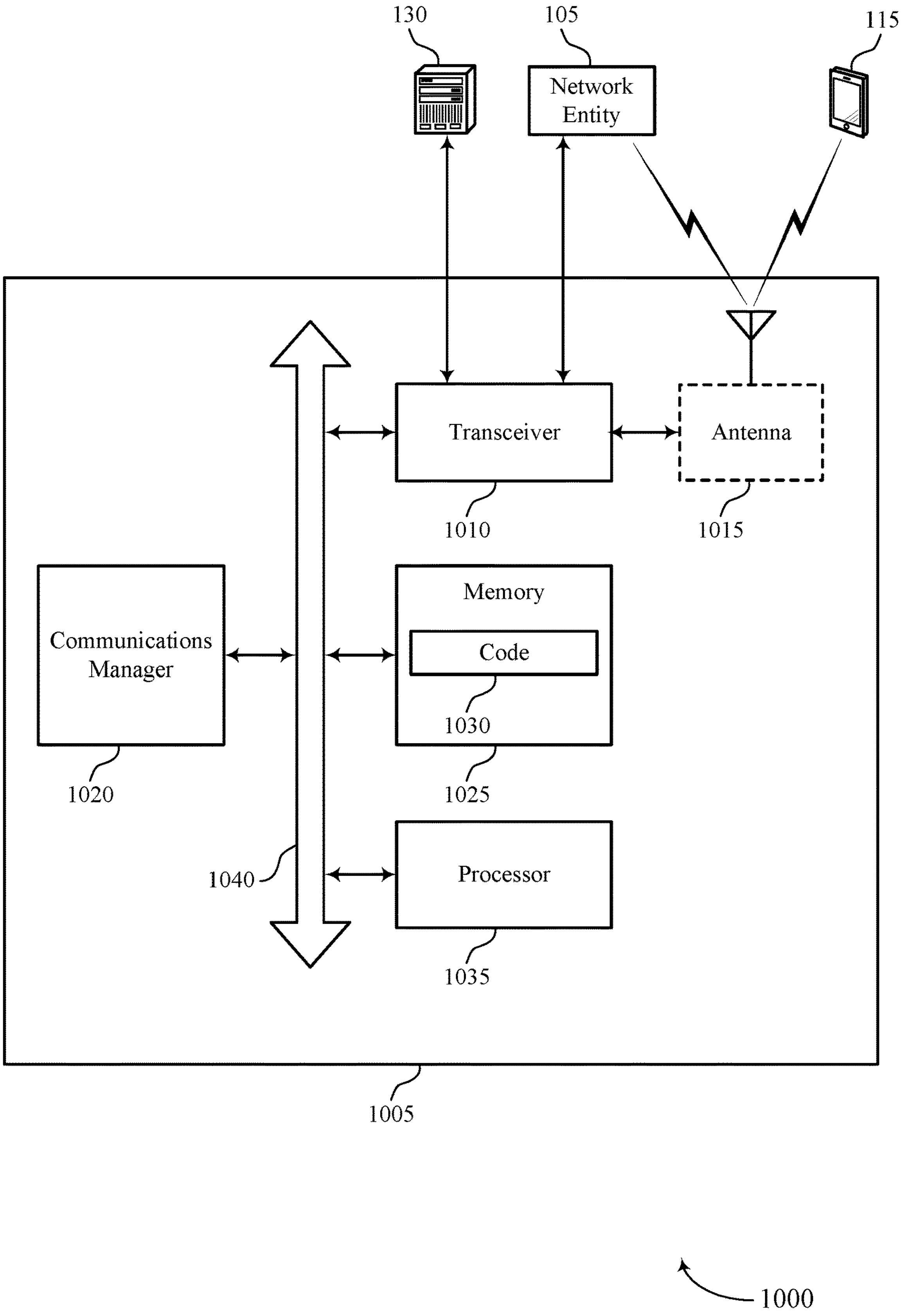
FIG. 10 shows a diagram of a system including a network entity that supports probabilistic constellation shaping for PAPR reduction in narrow band in accordance with one or more aspects of the present disclosure.

FIG. 10 shows a diagram of a system 1000 including a device 1005 that supports probabilistic constellation shaping for PAPR reduction in narrow band in accordance with one or more aspects of the present disclosure. The device 1005 may be an example of or include the components of a device 605, a device 705, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, at least one memory 1025 (e.g., one or more memories 1025), code 1030 (e.g., processor-executable code), and at least one processor 1035 (e.g., one or more processors 1035). These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (e.g., the at least one processor 1035, the at least one memory 1025, or both), may be included in a chip or chip assembly that is installed in the device 1005. In some examples, the transceiver 1010 may be operable to support communications via one or more communications links (e.g., a communication link 125, a backhaul communication link 120, a midhaul communication link 162, a fronthaul communication link 168).

The at least one memory 1025 may include RAM, ROM, or any combination thereof. The at least one memory 1025 may store computer-readable, computer-executable code 1030 including instructions that, when executed by one or more of the at least one processor 1035, cause the device 1005 to perform various functions described herein. The code 1030 may be stored in a non-transitory computer-readable medium such as system memory or another type of memory. In some cases, the code 1030 may not be directly executable by a processor of the at least one processor 1035 but may cause a computer (e.g., when compiled and executed) to perform functions described herein. In some cases, the at least one memory 1025 may contain, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (for example, as part of a processing system).

The at least one processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1035 may be configured to operate a memory array using a memory controller. In some other cases, a memory controller may be integrated into one or more of the at least one processor 1035. The at least one processor 1035 may be configured to execute computer-readable instructions stored in a memory (e.g., one or more of the at least one memory 1025) to cause the device 1005 to perform various functions (e.g., functions or tasks supporting probabilistic constellation shaping for PAPR reduction in narrow band). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within one or more of the at least one memory 1025). In some implementations, the at least one processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the at least one processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with ULEs 115 in cooperation with other network entities 105. In some examples, the communications manager 1020 may support an X2 interface within an LTE/LTE-A wireless communications network technology to provide communication between network entities 105.

The communications manager 1020 may support wireless communications by a wireless communication device in accordance with examples as disclosed herein. For example, the communications manager 1020 is capable of, configured to, or operable to support a means for transmitting an indication of a PS constellation being enabled for transmission of one or more messages. The communications manager 1020 is capable of, configured to, or operable to support a means for communicating a grant indicating a set of resources including one or more resource blocks for transmission of a message of the one or more messages. The communications manager 1020 is capable of, configured to, or operable to support a means for transmitting the message over the set of resources in accordance with the PS constellation based on a quantity of the one or more resource blocks of the set of resources failing to satisfy a threshold quantity of resource blocks.

Additionally, or alternatively, the communications manager 1020 may support wireless communication by a wireless communication device in accordance with examples as disclosed herein. For example, the communications manager 1020 is capable of, configured to, or operable to support a means for receiving an indication of a PS constellation being enabled for reception of one or more messages. The communications manager 1020 is capable of, configured to, or operable to support a means for communicating a grant indicating a set of resources including one or more resource blocks for receiving a message of the one or more messages. The communications manager 1020 is capable of, configured to, or operable to support a means for receiving the message over the set of resources in accordance with the PS constellation based on a quantity of the one or more resource blocks of the set of resources failing to satisfy a threshold quantity of resource blocks.

By including or configuring the communications manager 1020 in accordance with examples as described herein, the device 1005 may support techniques for improved communication reliability (e.g., due to decreased PAPR), longer battery life, improved coordination between devices, and more efficient utilization of communication resources due to higher throughput by utilizing constellations for PAPR reduction (e.g., in narrow-band) and various signaling as described herein.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (for example, by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of probabilistic constellation shaping for PAPR reduction in narrow band as described herein, or the at least one processor 1035 and the at least one memory 1025 may be otherwise configured to, individually or collectively, perform or support such operations.

Figure 11:
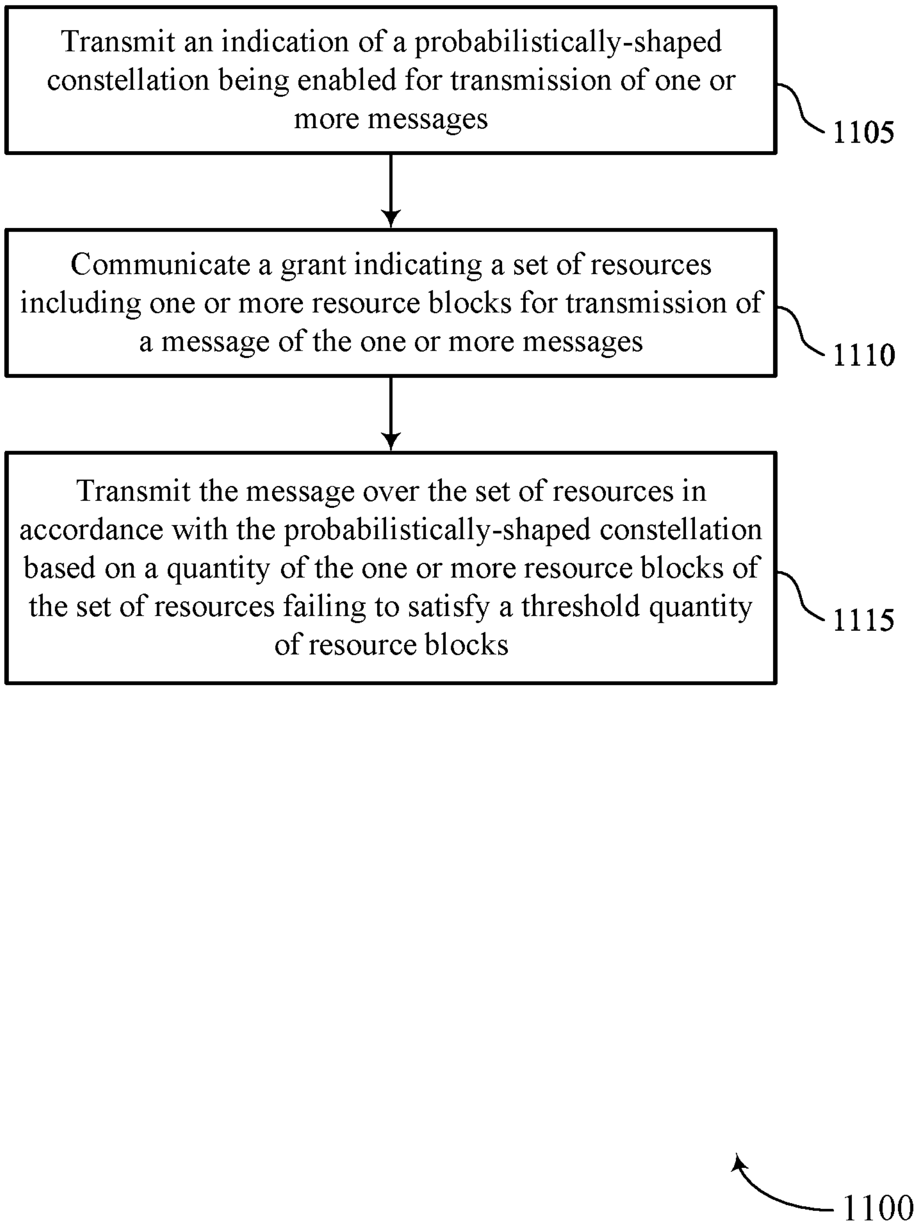
FIGS. 11 through 14 show flowcharts illustrating methods that support probabilistic constellation shaping for PAPR reduction in narrow band in accordance with one or more aspects of the present disclosure.

FIG. 11 shows a flowchart illustrating a method 1100 that supports probabilistic constellation shaping for PAPR reduction in narrow band in accordance with aspects of the present disclosure. The operations of the method 1100 may be implemented by a UE or a network entity or its components as described herein. For example, the operations of the method 1100 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include transmitting an indication of a PS constellation being enabled for transmission of one or more messages. The operations of block 1105 may be performed in accordance with examples as disclosed herein. In some examples, aspects of the operations of 1105 may be performed by a constellation indication component 825 as described with reference to FIG. 8.

At 1110, the method may include communicating a grant indicating a set of resources including one or more resource blocks for transmission of a message of the one or more messages. The operations of block 1110 may be performed in accordance with examples as disclosed herein. In some examples, aspects of the operations of 1110 may be performed by a grant component 830 as described with reference to FIG. 8.

At 1115, the method may include transmitting the message over the set of resources in accordance with the PS constellation based on a quantity of the one or more resource blocks of the set of resources failing to satisfy a threshold quantity of resource blocks. The operations of block 1115 may be performed in accordance with examples as disclosed herein. In some examples, aspects of the operations of 1115 may be performed by an encoding component 835 as described with reference to FIG. 8.

Figure 12:
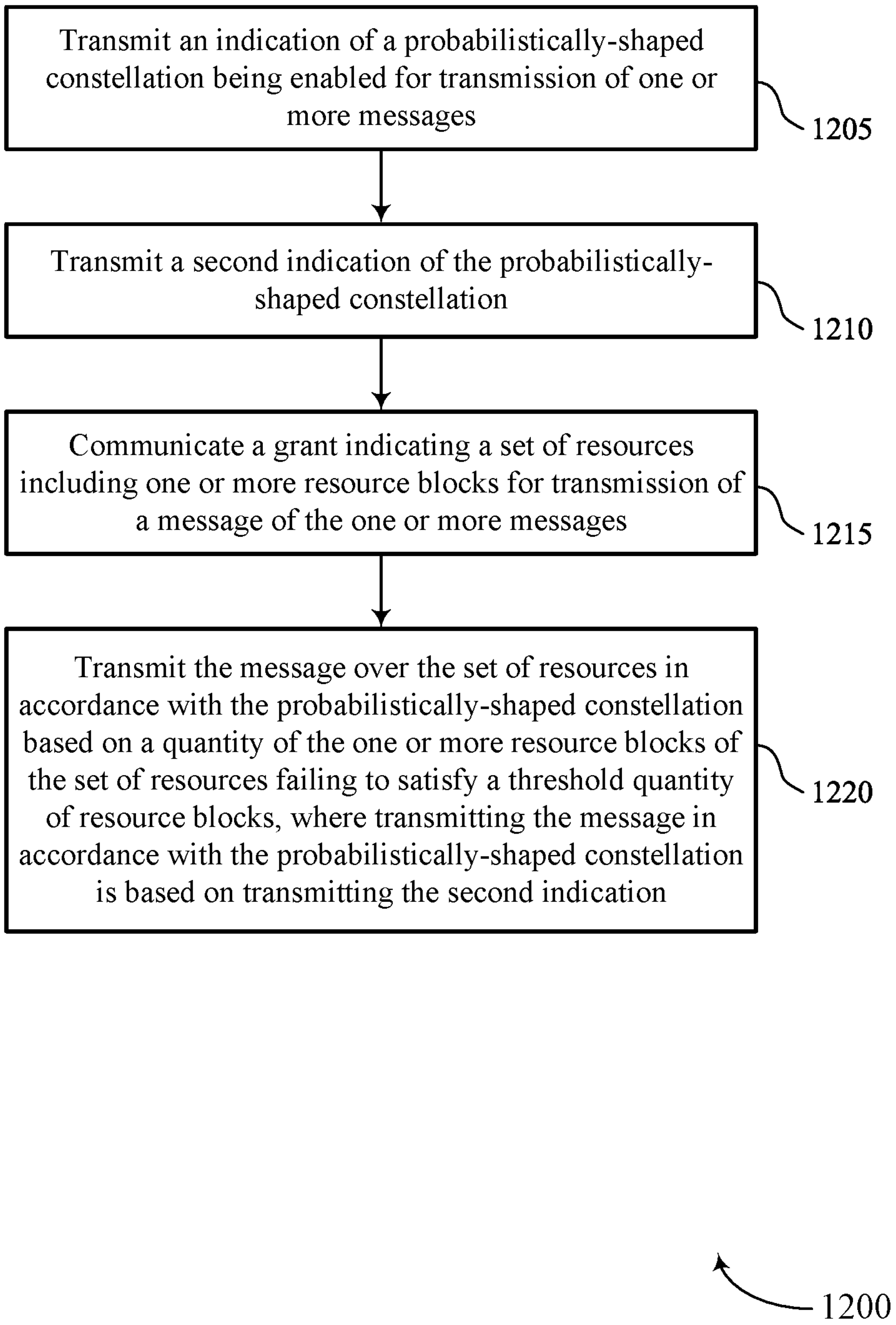

FIG. 12 shows a flowchart illustrating a method 1200 that supports probabilistic constellation shaping for PAPR reduction in narrow band in accordance with aspects of the present disclosure. The operations of the method 1200 may be implemented by a UE or a network entity or its components as described herein. For example, the operations of the method 1200 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include transmitting an indication of a PS constellation being enabled for transmission of one or more messages. The operations of block 1205 may be performed in accordance with examples as disclosed herein. In some examples, aspects of the operations of 1205 may be performed by a constellation indication component 825 as described with reference to FIG. 8.

At 1210, the method may include transmitting a second indication of the PS constellation. The operations of block 1210 may be performed in accordance with examples as disclosed herein. In some examples, aspects of the operations of 1210 may be performed by a constellation indication component 825 as described with reference to FIG. 8.

At 1215, the method may include communicating a grant indicating a set of resources including one or more resource blocks for transmission of a message of the one or more messages. The operations of block 1215 may be performed in accordance with examples as disclosed herein. In some examples, aspects of the operations of 1215 may be performed by a grant component 830 as described with reference to FIG. 8.

At 1220, the method may include transmitting the message over the set of resources in accordance with the PS constellation based on a quantity of the one or more resource blocks of the set of resources failing to satisfy a threshold quantity of resource blocks, where transmitting the message in accordance with the PS constellation is based on transmitting the second indication. The operations of block 1220 may be performed in accordance with examples as disclosed herein. In some examples, aspects of the operations of 1220 may be performed by an encoding component 835 as described with reference to FIG. 8.

Figure 13:
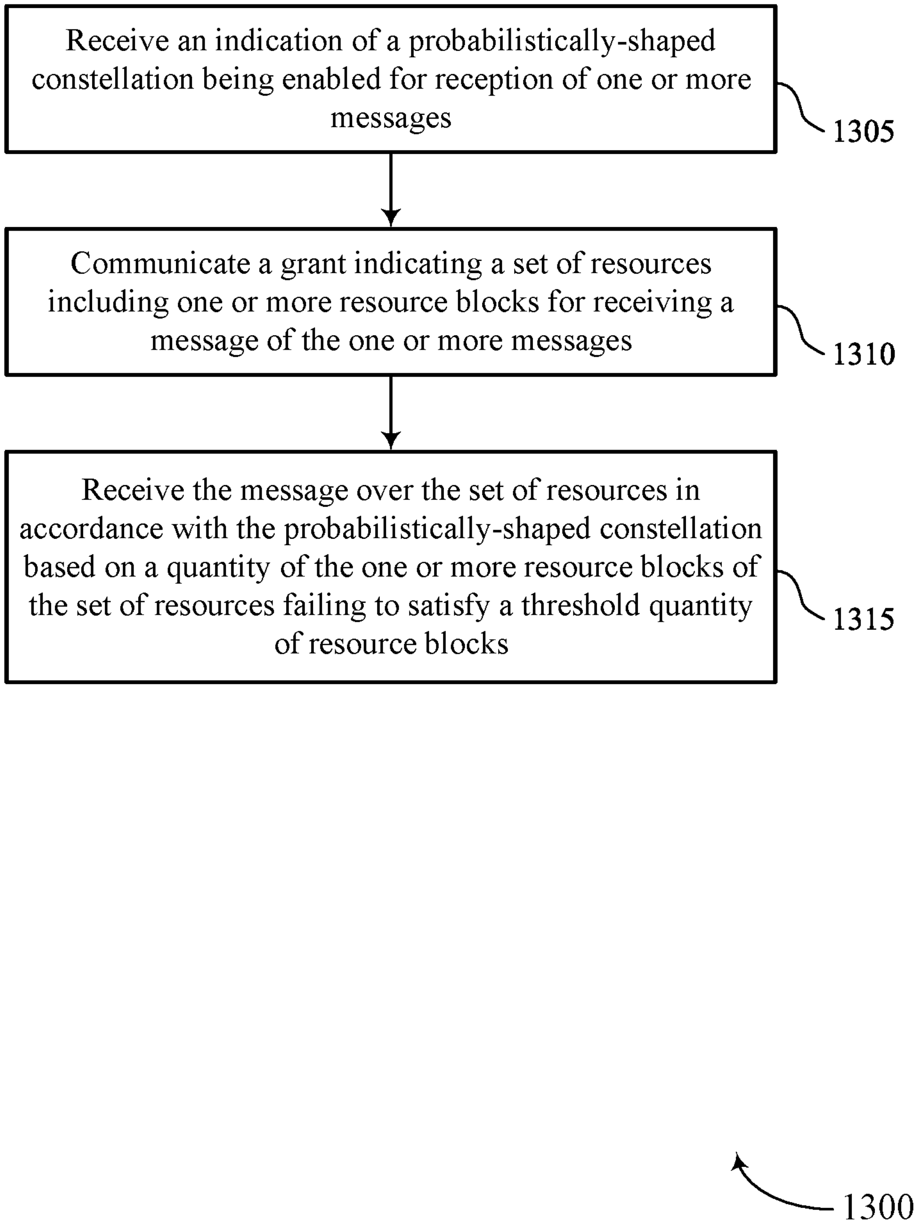

FIG. 13 shows a flowchart illustrating a method 1300 that supports probabilistic constellation shaping for PAPR reduction in narrow band in accordance with aspects of the present disclosure. The operations of the method 1300 may be implemented by a UE or a network entity or its components as described herein. For example, the operations of the method 1300 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include receiving an indication of a PS constellation being enabled for reception of one or more messages. The operations of block 1305 may be performed in accordance with examples as disclosed herein. In some examples, aspects of the operations of 1305 may be performed by a constellation indication component 825 as described with reference to FIG. 8.

At 1310, the method may include communicating a grant indicating a set of resources including one or more resource blocks for receiving a message of the one or more messages. The operations of block 1310 may be performed in accordance with examples as disclosed herein. In some examples, aspects of the operations of 1310 may be performed by a grant component 830 as described with reference to FIG. 8.

At 1315, the method may include receiving the message over the set of resources in accordance with the PS constellation based on a quantity of the one or more resource blocks of the set of resources failing to satisfy a threshold quantity of resource blocks. The operations of block 1315 may be performed in accordance with examples as disclosed herein. In some examples, aspects of the operations of 1315 may be performed by a decoding component 840 as described with reference to FIG. 8.

Figure 14:
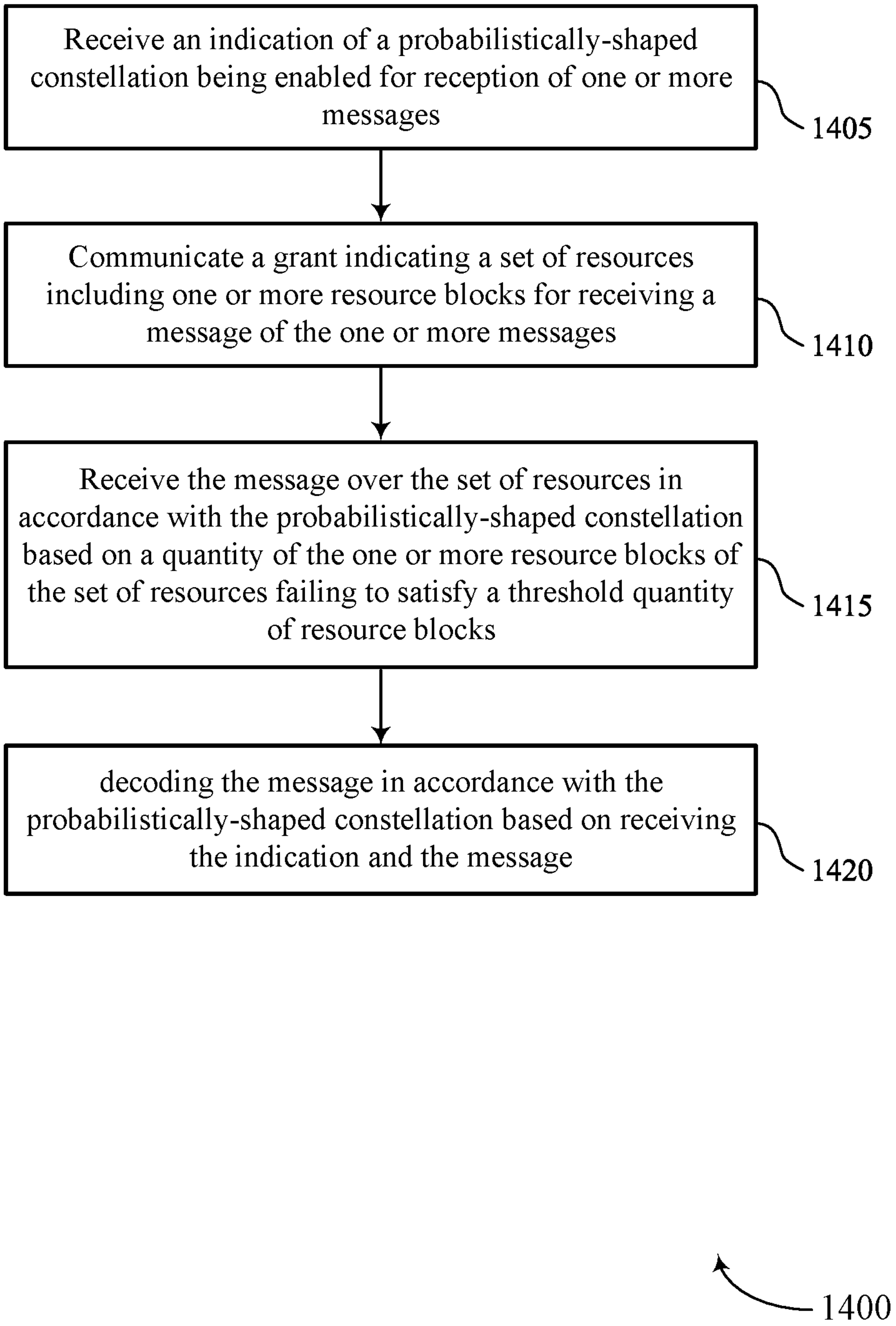

FIG. 14 shows a flowchart illustrating a method 1400 that supports probabilistic constellation shaping for PAPR reduction in narrow band in accordance with aspects of the present disclosure. The operations of the method 1400 may be implemented by a UE or a network entity or its components as described herein. For example, the operations of the method 1400 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include receiving an indication of a PS constellation being enabled for reception of one or more messages. The operations of block 1405 may be performed in accordance with examples as disclosed herein. In some examples, aspects of the operations of 1405 may be performed by a constellation indication component 825 as described with reference to FIG. 8.

At 1410, the method may include communicating a grant indicating a set of resources including one or more resource blocks for receiving a message of the one or more messages. The operations of block 1410 may be performed in accordance with examples as disclosed herein. In some examples, aspects of the operations of 1410 may be performed by a grant component 830 as described with reference to FIG. 8.

At 1415, the method may include receiving the message over the set of resources in accordance with the PS constellation based on a quantity of the one or more resource blocks of the set of resources failing to satisfy a threshold quantity of resource blocks. The operations of block 1415 may be performed in accordance with examples as disclosed herein. In some examples, aspects of the operations of 1415 may be performed by a decoding component 840 as described with reference to FIG. 8.

At 1420, the method may include decoding the message in accordance with the PS constellation based on receiving the indication and the message. The operations of block 1420 may be performed in accordance with examples as disclosed herein. In some examples, aspects of the operations of 1420 may be performed by a decoding component 840 as described with reference to FIG. 8.

The following provides an overview of aspects of the present disclosure:

Aspect 1: A method for wireless communications by a wireless communication device, comprising: transmitting an indication of a probabilistically-shaped constellation being enabled for transmission of one or more messages; communicating a grant indicating a set of resources comprising one or more resource blocks for transmission of a message of the one or more messages; and transmitting the message over the set of resources in accordance with the probabilistically-shaped constellation based at least in part on a quantity of the one or more resource blocks of the set of resources failing to satisfy a threshold quantity of resource blocks.

Aspect 2: The method of aspect 1, further comprising: transmitting a second indication of the probabilistically-shaped constellation, wherein transmitting the message in accordance with the probabilistically-shaped constellation is based at least in part on transmitting the second indication.

Aspect 3: The method of aspect 2, wherein the second indication comprises an index corresponding to the probabilistically-shaped constellation.

Aspect 4: The method of any of aspects 1 through 3, further comprising: receiving a capability message indicating a capability to decode the probabilistically-shaped constellation, wherein transmitting the message in accordance with the probabilistically-shaped constellation is based at least in part on receiving the capability message.

Aspect 5: The method of any of aspects 1 through 4, further comprising: communicating a second grant for a second message indicating a second set of resources comprising one or more second resource blocks; and transmitting the second message over the second set of resources in accordance with a constellation different from the probabilistically-shaped constellation based at least in part on a quantity of the one or more second resource blocks of the second set of resources satisfying the threshold quantity of resource blocks.

Aspect 6: The method of any of aspects 1 through 5, wherein the wireless communication device comprises a UE, communicating the grant comprises receiving the grant indicating the set of resources, and transmitting the message comprises transmitting an uplink message over the set of resources based at least in part on receiving the grant.

Aspect 7: The method of any of aspects 1 through 5, wherein the wireless communication device comprises a network entity, communicating the grant comprises transmitting the grant indicating the set of resources, and transmitting the message comprises transmitting a downlink message over the set of resources based at least in part on transmitting the grant.

Aspect 8: The method of any of aspects 1 through 7, wherein the indication comprises a flag in a downlink control information message or a medium access control control element message.

Aspect 9: The method of any of aspects 1 through 7, wherein the indication comprises a flag in a radio resource control message.

Aspect 10: The method of any of aspects 1 through 9, wherein the message comprises a control information message.

Aspect 11: A method for wireless communications by a wireless communication device, comprising: receiving an indication of a probabilistically-shaped constellation being enabled for reception of one or more messages; communicating a grant indicating a set of resources comprising one or more resource blocks for receiving a message of the one or more messages; and receiving the message over the set of resources in accordance with the probabilistically-shaped constellation based at least in part on a quantity of the one or more resource blocks of the set of resources failing to satisfy a threshold quantity of resource blocks.

Aspect 12: The method of aspect 11, further comprising: receiving a second indication of the probabilistically-shaped constellation, wherein receiving the message in accordance with the probabilistically-shaped constellation is based at least in part on receiving the second indication.

Aspect 13: The method of aspect 12, wherein the second indication comprises an index corresponding to the probabilistically-shaped constellation.

Aspect 14: The method of any of aspects 11 through 13, further comprising: decoding the message in accordance with the probabilistically-shaped constellation based at least in part on receiving the indication and the message.

Aspect 15: The method of aspect 14, further comprising: transmitting a capability message indicating a capability to decode the probabilistically-shaped constellation, wherein receiving the message in accordance with the probabilistically-shaped constellation and decoding the message is based at least in part on transmitting the capability message.

Aspect 16: The method of any of aspects 11 through 15, further comprising: communicating a second grant for a second message indicating a second set of resources comprising one or more second resource blocks; and receiving the second message over the second set of resources in accordance with a constellation different from the probabilistically-shaped constellation based at least in part on a quantity of the one or more second resource blocks of the second set of resources satisfying the threshold quantity of resource blocks.

Aspect 17: The method of any of aspects 11 through 16, wherein the wireless communication device comprises a UE, communicating the grant comprises receiving the grant indicating the set of resources, and receiving the message comprises receiving a downlink message over the set of resources based at least in part on receiving the grant.

Aspect 18: The method of any of aspects 11 through 16, wherein the wireless communication device comprises a network entity, communicating the grant comprises transmitting the grant indicating the set of resources, and receiving the message comprises receiving an uplink message over the set of resources based at least in part on transmitting the grant.

Aspect 19: The method of any of aspects 11 through 18, wherein the indication comprises a flag in a downlink control information message or a medium access control control element message.

Aspect 20: The method of any of aspects 11 through 18, wherein the indication comprises a flag in a radio resource control message.

Aspect 21: The method of any of aspects 11 through 20, wherein the message comprises a control information message.

Aspect 22: A wireless communication device for wireless communication, comprising one or more processors; and one or more memories coupled to the one or more processors, the one or more memories comprising instructions executable by the one or more processors individually or collectively to cause the wireless communication device to perform a method of any of aspects 1 through 10.

Aspect 23: A wireless communication device for wireless communication, comprising at least one means for performing a method of any of aspects 1 through 10.

Aspect 24: A non-transitory computer-readable medium storing code for wireless communication by a wireless communication device, the code comprising instructions executable one or more processors to perform a method of any of aspects 1 through 10.

Aspect 25: A wireless communication device for wireless communication, comprising one or more processors; and one or more memories coupled to the one or more processors, the one or more memories comprising instructions executable by the one or more processors individually or collectively to cause the wireless communication device to perform a method of any of aspects 11 through 21.

Aspect 26: A wireless communication device for wireless communication, comprising at least one means for performing a method of any of aspects 11 through 21.

Aspect 27: A non-transitory computer-readable medium storing code for wireless communication by a wireless communication device, the code comprising instructions executable one or more processors to perform a method of any of aspects 11 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless communication device for wireless communication, comprising:

one or more processors; and one or more memories coupled to the one or more processors, the one or more memories comprising instructions executable by the one or more processors individually or collectively to cause the wireless communication device to:

transmit an indication of a probabilistically-shaped constellation being enabled for transmission of one or more messages, wherein the probabilistically-shaped constellation comprises a first constellation point that is assigned a higher probability than a second constellation point of the probabilistically-shaped constellation;

communicate a grant indicating a set of resources comprising one or more resource blocks for transmission of a message of the one or more messages; and transmit the message over the set of resources in accordance with the probabilistically-shaped constellation based at least in part on a quantity of the one or more resource blocks of the set of resources failing to satisfy a threshold quantity of resource blocks.

2. The wireless communication device of claim 1, wherein the instructions are further executable by the one or more processors individually or collectively to cause the wireless communication device to:

transmit a second indication of the probabilistically-shaped constellation, wherein transmitting the message in accordance with the probabilistically-shaped constellation is based at least in part on transmitting the second indication.

3. The wireless communication device of claim 2, wherein the second indication comprises an index corresponding to the probabilistically-shaped constellation.

4. The wireless communication device of claim 1, wherein the instructions are further executable by the one or more processors individually or collectively to cause the wireless communication device to:

receive a capability message indicating a capability to decode the probabilistically-shaped constellation, wherein transmitting the message in accordance with the probabilistically-shaped constellation is based at least in part on receiving the capability message.

5. The wireless communication device of claim 1, wherein the instructions are further executable by the one or more processors individually or collectively to cause the wireless communication device to:

communicate a second grant for a second message indicating a second set of resources comprising one or more second resource blocks; and transmit the second message over the second set of resources in accordance with a constellation different from the probabilistically-shaped constellation based at least in part on a quantity of the one or more second resource blocks of the second set of resources satisfying the threshold quantity of resource blocks.

6. The wireless communication device of claim 1, wherein the wireless communication device comprises a user equipment (UE), wherein communicating the grant comprises receiving the grant indicating the set of resources, and wherein transmitting the message comprises transmitting an uplink message over the set of resources based at least in part on receiving the grant.

7. The wireless communication device of claim 1, wherein the wireless communication device comprises a network entity, wherein communicating the grant comprises transmitting the grant indicating the set of resources, and wherein transmitting the message comprises transmitting a downlink message over the set of resources based at least in part on transmitting the grant.

8. The wireless communication device of claim 1, wherein the indication comprises a flag in a downlink control information message, in an uplink control information message, or in a medium access control control element message.

9. The wireless communication device of claim 1, wherein the indication comprises a flag in a radio resource control message.

10. The wireless communication device of claim 1, wherein the message comprises a control information message.

11. A wireless communication device for wireless communication, comprising:

one or more processors; and one or more memories coupled to the one or more processors, the one or more memories comprising instructions executable by the one or more processors individually or collectively to cause the wireless communication device to:

receive an indication of a probabilistically-shaped constellation being enabled for reception of one or more messages, wherein the probabilistically-shaped constellation comprises a first constellation point that is assigned a higher probability than a second constellation point of the probabilistically-shaped constellation;

communicate a grant indicating a set of resources comprising one or more resource blocks for receiving a message of the one or more messages; and receive the message over the set of resources in accordance with the probabilistically-shaped constellation based at least in part on a quantity of the one or more resource blocks of the set of resources failing to satisfy a threshold quantity of resource blocks.

12. The wireless communication device of claim 11, wherein the instructions are further executable by the one or more processors individually or collectively to cause the wireless communication device to:

receive a second indication of the probabilistically-shaped constellation, wherein receiving the message in accordance with the probabilistically-shaped constellation is based at least in part on receiving the second indication.

13. The wireless communication device of claim 12, wherein the second indication comprises an index corresponding to the probabilistically-shaped constellation.

14. The wireless communication device of claim 11, wherein the instructions are further executable by the one or more processors individually or collectively to cause the wireless communication device to:

decode the message in accordance with the probabilistically-shaped constellation based at least in part on receiving the indication and the message.

15. The wireless communication device of claim 14, wherein the instructions are further executable by the one or more processors individually or collectively to cause the wireless communication device to:

transmit a capability message indicating a capability to decode the probabilistically-shaped constellation, wherein receiving the message in accordance with the probabilistically-shaped constellation and decoding the message is based at least in part on transmitting the capability message.

16. The wireless communication device of claim 11, wherein the instructions are further executable by the one or more processors individually or collectively to cause the wireless communication device to:

communicate a second grant for a second message indicating a second set of resources comprising one or more second resource blocks; and receive the second message over the second set of resources in accordance with a constellation different from the probabilistically-shaped constellation based at least in part on a quantity of the one or more second resource blocks of the second set of resources satisfying the threshold quantity of resource blocks.

17. The wireless communication device of claim 11, wherein the wireless communication device comprises a user equipment (UE), wherein communicating the grant comprises receiving the grant indicating the set of resources, and wherein receiving the message comprises receiving a downlink message over the set of resources based at least in part on receiving the grant.

18. The wireless communication device of claim 11, wherein the wireless communication device comprises a network entity, wherein communicating the grant comprises transmitting the grant indicating the set of resources, and wherein receiving the message comprises receiving an uplink message over the set of resources based at least in part on transmitting the grant.

19. The wireless communication device of claim 11, wherein the indication comprises a flag in a downlink control information message, in an uplink control information message, or a in medium access control control element message.

20. The wireless communication device of claim 11, wherein the indication comprises a flag in a radio resource control message.

21. The wireless communication device of claim 11, wherein the message comprises a control information message.

22. A method for wireless communication by a wireless communication device, comprising:

transmitting an indication of a probabilistically-shaped constellation being enabled for transmission of one or more messages, wherein the probabilistically-shaped constellation comprises a first constellation point that is assigned a higher probability than a second constellation point of the probabilistically-shaped constellation;

communicating a grant indicating a set of resources comprising one or more resource blocks for transmission of a message of the one or more messages; and transmitting the message over the set of resources in accordance with the probabilistically-shaped constellation based at least in part on a quantity of the one or more resource blocks of the set of resources failing to satisfy a threshold quantity of resource blocks.

23. The method of claim 22, further comprising:

transmitting a second indication of the probabilistically-shaped constellation, wherein transmitting the message in accordance with the probabilistically-shaped constellation is based at least in part on transmitting the second indication.

24. The method of claim 22, further comprising:

receiving a capability message indicating a capability to decode the probabilistically-shaped constellation, wherein transmitting the message in accordance with the probabilistically-shaped constellation is based at least in part on receiving the capability message.

25. The method of claim 22, further comprising:

communicating a second grant for a second message indicating a second set of resources comprising one or more second resource blocks; and transmitting the second message over the second set of resources in accordance with a constellation different from the probabilistically-shaped constellation based at least in part on a quantity of the one or more second resource blocks of the second set of resources satisfying the threshold quantity of resource blocks.

26. A method for wireless communication by a wireless communication device, comprising:

receiving an indication of a probabilistically-shaped constellation being enabled for reception of one or more messages, wherein the probabilistically-shaped constellation comprises a first constellation point that is assigned a higher probability than a second constellation point of the probabilistically-shaped constellation;

communicating a grant indicating a set of resources comprising one or more resource blocks for receiving a message of the one or more messages; and receiving the message over the set of resources in accordance with the probabilistically-shaped constellation based at least in part on a quantity of the one or more resource blocks of the set of resources failing to satisfy a threshold quantity of resource blocks.

27. The method of claim 26, further comprising:

receiving a second indication of the probabilistically-shaped constellation, wherein receiving the message in accordance with the probabilistically-shaped constellation is based at least in part on receiving the second indication.

28. The method of claim 26, further comprising:

decoding the message in accordance with the probabilistically-shaped constellation based at least in part on receiving the indication and the message.

29. The method of claim 28, further comprising:

transmitting a capability message indicating a capability to decode the probabilistically-shaped constellation, wherein receiving the message in accordance with the probabilistically-shaped constellation and decoding the message is based at least in part on transmitting the capability message.

30. The method of claim 26, further comprising:

communicating a second grant for a second message indicating a second set of resources comprising one or more second resource blocks; and receiving the second message over the second set of resources in accordance with a constellation different from the probabilistically-shaped constellation based at least in part on a quantity of the one or more second resource blocks of the second set of resources satisfying the threshold quantity of resource blocks.

* * * * *